US011800338B2

(12) United States Patent
Peng et al.

(10) Patent No.: US 11,800,338 B2
(45) Date of Patent: Oct. 24, 2023

(54) MANAGEMENT SYSTEM, DEVICE, AND SERVER FOR CONTROLLING MESH NETWORK

(71) Applicant: Good Way Technology Co., LTD., New Taipei (TW)

(72) Inventors: Tsu-I Peng, New Taipei (TW); Chang-Der Liu, New Taipei (TW); Cheng-Kang Tsui, New Taipei (TW)

(73) Assignee: Good Way Technology Co., LTD., New Taipei (TW)

( * ) Notice: Subject to any disclaimer, the term of this patent is extended or adjusted under 35 U.S.C. 154(b) by 150 days.

(21) Appl. No.: 17/444,387

(22) Filed: Aug. 4, 2021

(65) Prior Publication Data

US 2022/0210730 A1   Jun. 30, 2022

Related U.S. Application Data

(60) Provisional application No. 63/131,327, filed on Dec. 29, 2020.

(51) Int. Cl.
*H04W 4/80* (2018.01)
*H04B 17/318* (2015.01)
(Continued)

(52) U.S. Cl.
CPC .......... *H04W 4/80* (2018.02); *G06F 13/4068* (2013.01); *G06F 21/44* (2013.01); *H04B 17/318* (2015.01);
(Continued)

(58) Field of Classification Search
CPC .. H04W 84/12; H04W 12/06; H04M 1/72412
(Continued)

(56) References Cited

U.S. PATENT DOCUMENTS 5,752,917 A  *  5/1998  Fuchs ................... G16H 40/63
                                              600/484
8,292,807 B2    10/2012  Perkins et al.
(Continued)

FOREIGN PATENT DOCUMENTS

CN           102483728 A      5/2012
CN           105869225 A      8/2016
(Continued)

OTHER PUBLICATIONS

Good Way Technology Co., Ltd, "Smart Dock", uploaded on Aug. 5, 2020, retrieved form the Internet: http://www.gtrend-auto.com/products-DUD8070.asp on Aug. 4, 2021.

*Primary Examiner* — Kiet M Doan
(74) *Attorney, Agent, or Firm* — CKC & Partners Co., LLC

(57) ABSTRACT

The present disclosure discloses a management system, including an access point, a plurality of docking station devices, and a backend server. Each docking station device includes an interface, a sensor, a wireless sensor network transceiver circuit, a Wi-Fi transceiver circuit, and a control circuit. The interface is configured to couple electronic devices. The sensor is configured to measure a value. The wireless sensor network transceiver circuit is configured to receive and transmit data from and to the other docking station devices. The Wi-Fi transceiver circuit is configured to receive and transmit data from and to the access point. The backend serve is communicatively connected to the access point and one or several of the docking station devices. The docking station devices are communicatively connected to each other to form a mesh network.

57 Claims, 14 Drawing Sheets

(51) Int. Cl.
*H04W 48/20* (2009.01)
*G06F 13/40* (2006.01)
*G06F 21/44* (2013.01)
*H04W 48/18* (2009.01)
*H04W 84/12* (2009.01)

(52) U.S. Cl.
CPC ............ *H04W 48/20* (2013.01); *H04W 48/18* (2013.01); *H04W 84/12* (2013.01)

(58) Field of Classification Search
USPC ............ 345/173; 348/14.01; 455/41.2, 404.1
See application file for complete search history.

(56) References Cited

U.S. PATENT DOCUMENTS

| | | | |
|---|---|---|---|
| 9,204,257 | B1 | 12/2015 | Mendelson |
| 9,602,193 | B1 | 3/2017 | Mendelson |
| 9,959,228 | B2 | 5/2018 | Lin |
| 10,039,147 | B2 | 7/2018 | Cohn et al. |
| 10,578,657 | B2 | 3/2020 | Decamp et al. |
| 11,579,653 | B2 | 2/2023 | Chan et al. |
| 2005/0164664 | A1 | 7/2005 | DiFonzo et al. |
| 2009/0148827 | A1 | 6/2009 | Argott |
| 2012/0054400 | A1 | 3/2012 | Iverson et al. |
| 2012/0155454 | A1 | 6/2012 | Eichen et al. |
| 2013/0311694 | A1 | 11/2013 | Bhamidipati et al. |
| 2016/0026837 | A1 | 1/2016 | Good et al. |
| 2016/0323975 | A1 | 11/2016 | White et al. |
| 2016/0353382 | A1* | 12/2016 | Xue ................. H04W 52/0251 |
| 2017/0134255 | A1 | 5/2017 | Amini et al. |
| 2017/0185462 | A1 | 6/2017 | Cox et al. |
| 2017/0345292 | A1* | 11/2017 | Haran .................... G08G 1/166 |
| 2017/0359190 | A1 | 12/2017 | Nadathur et al. |
| 2019/0302844 | A1 | 10/2019 | Kapinos et al. |
| 2020/0089303 | A1 | 3/2020 | Cannell et al. |
| 2020/0218324 | A1* | 7/2020 | Decamp ........... G06Q 10/06314 |
| 2020/0225722 | A1 | 7/2020 | Nge et al. |
| 2020/0241597 | A1 | 7/2020 | Decamp et al. |
| 2020/0304543 | A1 | 9/2020 | Hamlin et al. |
| 2021/0072792 | A1 | 3/2021 | Decamp et al. |
| 2023/0045879 | A1 | 2/2023 | Tunnell et al. |

FOREIGN PATENT DOCUMENTS

| | | |
|---|---|---|
| CN | 105026949 B | 6/2017 |
| CN | 110365559 A | 10/2019 |
| CN | 211044327 U | 7/2020 |
| CN | 112102511 A | 12/2020 |
| EP | 2768269 A1 | 8/2014 |
| TW | 200817973 A | 4/2008 |
| TW | 201032541 A | 9/2010 |
| TW | 201703495 A | 1/2017 |
| TW | 201737104 A | 10/2017 |
| TW | I606705 B | 11/2017 |
| TW | M552170 U | 11/2017 |
| TW | I607336 B | 12/2017 |
| TW | I636676 B | 9/2018 |
| TW | M569978 U | 11/2018 |
| TW | I657675 B | 4/2019 |
| TW | M579197 U | 6/2019 |
| TW | 202017350 A | 5/2020 |

* cited by examiner

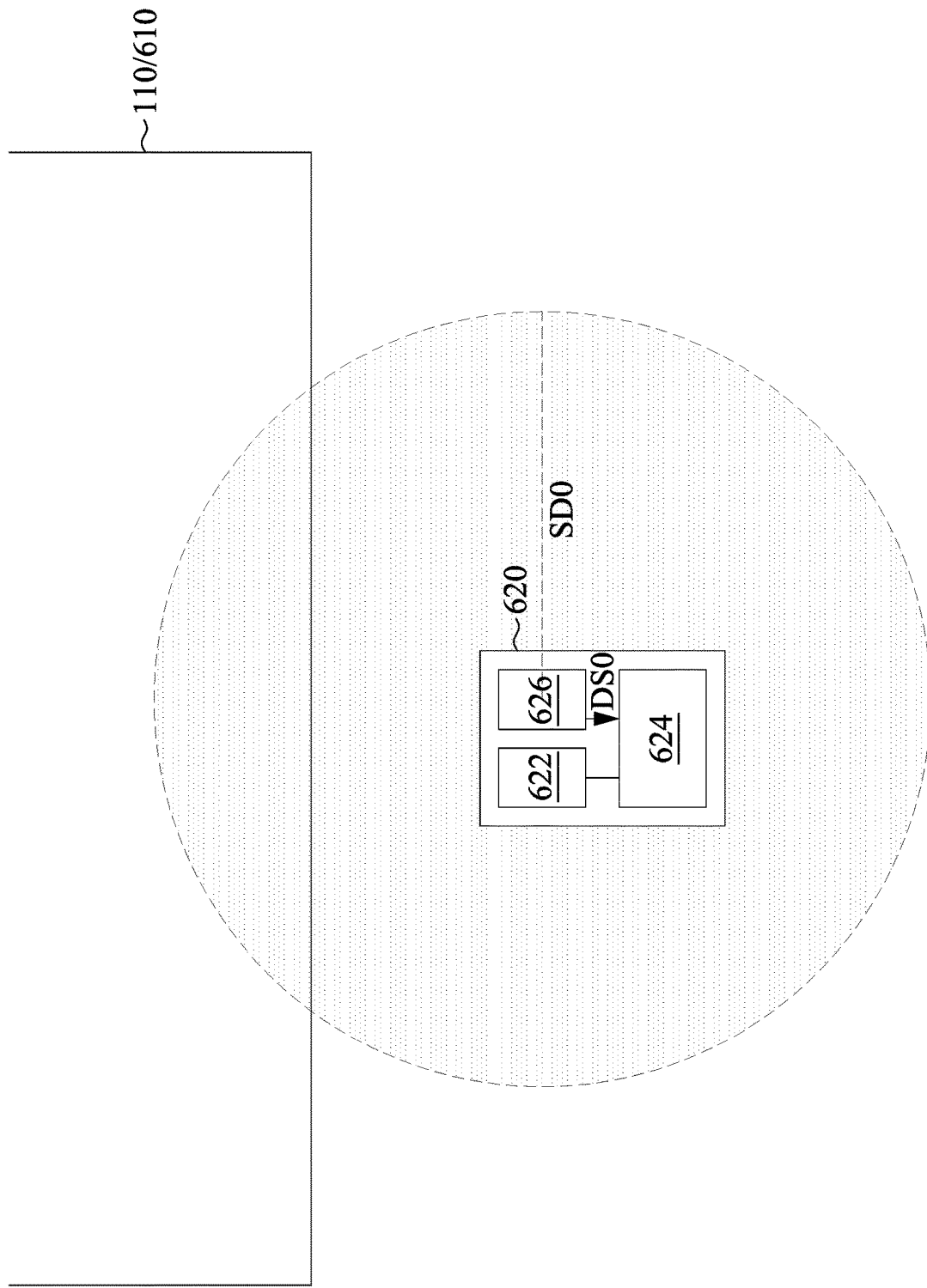

MANAGEMENT SYSTEM, DEVICE, AND SERVER FOR CONTROLLING MESH NETWORK

CROSS-REFERENCE TO RELATED APPLICATION

This application claims priority to U.S. Provisional Application Ser. No. 63/131,327, filed Dec. 29, 2020, which is herein incorporated by reference in its entirety.

BACKGROUND

Field of Invention

The present invention relates to a management system and method for controlling mesh network. More particularly, the present invention relates to a management system and method including an access point, a plurality of docking station devices, and a backend server.

Description of Related Art

Various needs exist in the area of modern workspace management. For example, all of the company's computers have to connect to the network and perform efficient data transmission, staff's attendance must be recorded every day, and the company must prevent its confidential information from being stored in electronic devices and taken out by employees. These needs are usually satisfied by using multiple different devices, instead of a single device.

SUMMARY

The invention provides a management system including an access point, a plurality of docking station devices, and a backend server. The access point is configured to receive and transmit data according to a Wi-Fi protocol. Each of the docking station devices includes an interface, a sensor, a wireless sensor network transceiver circuit, a Wi-Fi transceiver circuit, and a control circuit. The interface is configured to couple one or a plurality of electronic devices. The sensor is configured to measure a value. The wireless sensor network transceiver circuit is configured to receive and transmit data from and to the other docking station devices primarily according to a short-distance or low-energy wireless network communication protocol. The Wi-Fi transceiver circuit is configured to receive and transmit data from and to the access point according to a Wi-Fi protocol. The control circuit is coupled to the interface, the sensor, the wireless sensor network transceiver circuit, and the Wi-Fi transceiver circuit. The backend server is configured to be communicatively connected to the access point and one or more of the docking station devices. The docking station devices are configured to be communicatively connected to each other through the wireless sensor network transceiver circuits to form a mesh network.

The invention also provides a management method including determining whether the number of a plurality of nodes is smaller than N, and, if not, dividing the nodes into a plurality of groups, wherein each of the groups has the nodes of less than N; selecting one or more of the nodes in each group as one or a plurality of hub nodes according to strength or relay hops of wireless signal; determining whether the number of the hub nodes in each group is smaller than a minimum number of hub nodes, and, if yes, selecting one or more of the nodes as the new hub node(s); finding a plurality of relay nodes in the groups according to the number of relay hops of each nodes; and determining whether any of the hub nodes has a transmission loading greater than a transmission threshold, and, if yes, selecting one or more of the nodes as the new hub node(s).

BRIEF DESCRIPTION OF THE DRAWINGS

The invention can be more fully understood by reading the following detailed description of the embodiment, with reference made to the accompanying drawings as follows:

FIG. 7 is a schematic diagram of a beacon tag device in accordance with embodiments of the present disclosure.

DETAILED DESCRIPTION

Figure 1:
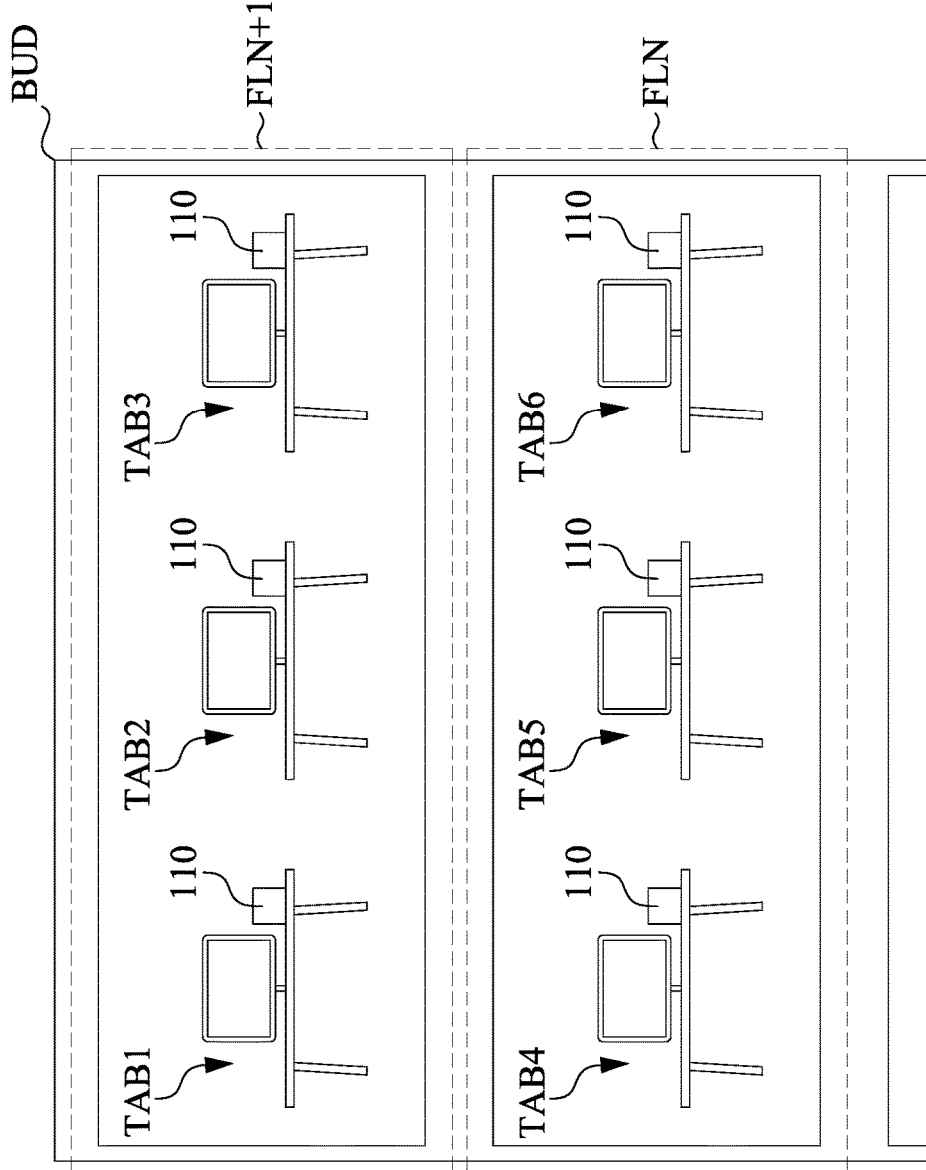
FIG. 1 is a schematic diagram of a management system in accordance with embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terms used in this specification generally have their ordinary meanings in the art, within the context of the invention, and in the specific context where each term is used.

As used in the present disclosure, the terms "comprising," "including," "having," "containing," "involving," and the like are to be understood to be open-ended, i.e., to mean including but not limiting to. In addition, as used in the present disclosure, the term "and/or" includes any and all combinations of one or more of the associated listed items.

It will be understood that when an element is referred to as being "connected to," "coupled to," or "electrically connected to" another element, it can be directly connected or coupled to the other element or intervening elements may be present. In contrast, when an element is referred to as being "directly connected to," "directly coupled to," or "directly electrically connected to" another element, there is no intervening element present. In addition, when an element is referred to as being "communicatively connected to"

another element, it can be indirectly or directly connected to the other element through wire or wireless communication. Moreover, it will be understood that, although the terms "first," "second," etc., may be used herein to describe various elements, these elements should not be limited by these terms. These terms are used to distinguish one element from another.

Some embodiments of the present disclosure are used to manage a workspace, the attendance of employees, and/or data security. Please refer to FIG. 1. FIG. 1 is a schematic diagram of a management system 100 in accordance with embodiments of the present disclosure. A building BUD is a building used as a workspace that has multiple floors. FIG. 1 illustrates an Nth floor FLN and an $(N+1)^{th}$ floor FLN+1 as examples. Each floor includes multiple tables that are assigned to and used by employees during working hours. For example, the Nth floor FLN includes tables TAB4~TAB6, and the $(N+1)^{th}$ floor FLN+1 includes tables TAB1~TAB3. It should be noted that the numbers of floors and tables in FIG. 1 are merely exemplary and do not intend to limit the embodiments of the present disclosure.

In the actual situation, employees often bring their laptops to work and might need to use an extra screen, to connect to the company's local area network or the Internet, to project his/her laptop screen to a larger screen, to connect to power supply, or to check in, and multifunctional docking stations mounted on their tables can assist employees to output their screens to the other monitors, to connect to the company's network, to check in or out, and to better manage their seats. Thus, in the embodiments of the present disclosure, each of the tables TAB1~TAB6 includes a docking station devices 110. In order to connect employees' computers to the network, the docking station device 110 on each table has to connect to each other and to the external Internet. The embodiments below describe how multiple docking station devices 110 can form a mesh network among them and connect to external network.

Figure 2:
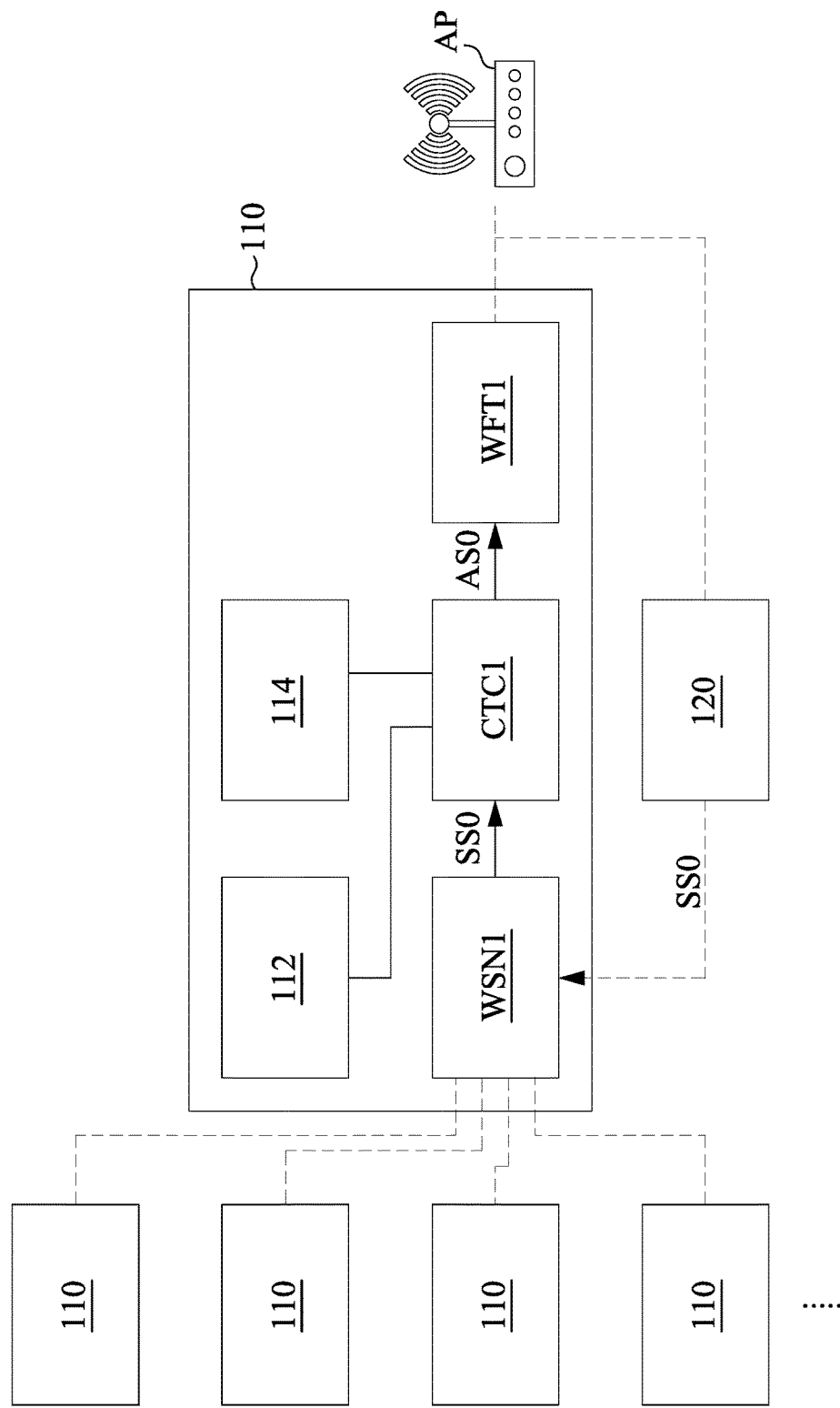
FIG. 2 is a schematic diagram of a management system in accordance with embodiments of the present disclosure.

The present disclosure provides a management system. Please refer to FIG. 2. FIG. 2 is a schematic diagram of a management system 200 in accordance with embodiments of the present disclosure. The management system 200 includes an access point AP, a plurality of docking station devices 110, and a backend server 120. The access point AP is configured to receive and transmit data according to a Wi-Fi protocol. The docking station 110 includes an interface 112, a sensor 114, a wireless sensor network transceiver circuit WSN1, a Wi-Fi transceiver circuit WFT1, and a control circuit CTC1.

The interface 112 is configured to connect to one or more electronic devices, e.g., a laptop, a universal serial bus (USB) device, a monitor, a mouse, an earphone, a cell phone, and/or a keyboard. In some embodiments, the interface 112 includes a universal serial bus interface and/or a display interface (e.g., HDMI or DP). The present disclosure will describe the interface 112 in more detail below. The sensor 114 is configured to measure a value, e.g., network flow, electric current, and/or strength of received signal strength indication (RSSI), in order to measure the network flow or electricity consumption of a specific table or to help employees check in or out. In some embodiments, the sensor 114 includes a network flow counter, a current sensor, and/or a radio frequency identification receiver. The present disclosure will describe the sensor 114 in more detail below.

The wireless sensor network (WSN) transceiver circuit WSN1 is configured to receive and transmit data from and to other docking station devices 110 primarily according to a short-distance or low-energy wireless network communication protocol. For example, the wireless sensor network transceiver circuit WSN1 can be a Bluetooth communication circuit, a Bluetooth Low Energy (BLE) communication circuit, or a Zigbee or Thread communication circuit. The Wi-Fi transceiver circuit WFT1 is configured to receive and transmit data from and to the access point AP according to a Wi-Fi protocol. In some embodiments, the Wi-Fi transceiver circuit WFT1 adopts a Wi-Fi wireless network protocol. In some embodiments, the electricity consumed by the wireless sensor network transceiver circuit WSN1 during standby and communication is relatively low compared with the Wi-Fi transceiver circuit WFT1. The wireless sensor network transceiver circuit WSN1 is more suitable for long-term short-distance transmission of package of low frequency band. On the other hand, the transmission distance and speed of the Wi-Fi transceiver circuit WFT1 is greater than the transmission distance and speed of the wireless sensor network transceiver circuit WSN1. The Wi-Fi transceiver circuit WFT1 is more suitable for long-distance transmission of packages of high frequency band. The control circuit CTC1 is coupled to the interface 112, the sensor 114, the wireless sensor network transceiver circuit WSN1, and the Wi-Fi transceiver circuit WFT1. The control circuit CTC1 is configured to process signals received from other components in the docking station device 110 and command other components to conduct specific operation. In one embodiment, the control circuit CTC1 is a processor. In one embodiment, the control circuit CTC1 and the other components are embedded or implemented in a device different from a docking device, and the function of the present disclosure can still be performed.

Figure 3:
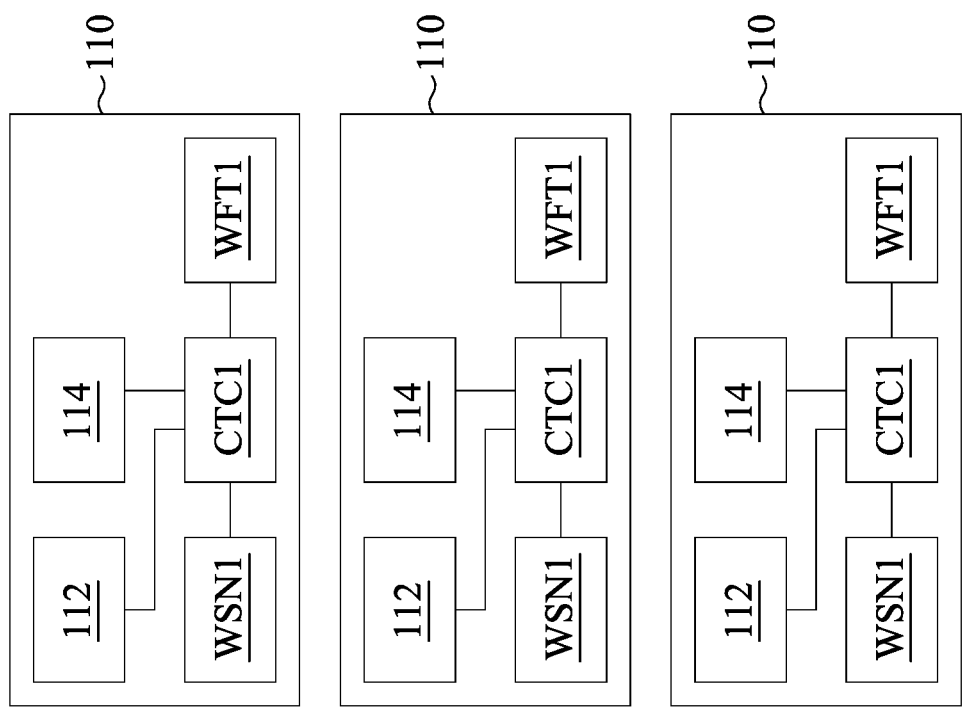
FIG. 3 is a schematic diagram of multiple docking station devices in accordance with embodiments of the present disclosure.

In one embodiment, the management system 200 is adapted to manage or control multiple docking station devices 110. Please refer to FIG. 3. FIG. 3 is a schematic diagram of multiple docking station devices 110 in accordance with embodiments of the present disclosure. The embodiment shown in FIG. 3 includes multiple docking station devices 110, and each of the docking station devices 110 includes the interface 112, the sensor 114, the wireless sensor network transceiver circuit WSN1, the Wi-Fi transceiver circuit WFT1, and the control circuit CTC1.

The following paragraphs describe the data transmission of the management system 200. Please refer to FIG. 2 again. In the management system 200, the docking stations 110 are connected to each other through their own wireless sensor network transceiver circuit WSN1 and form a mesh network. The mesh network is a network in which devices or nodes are linked together, branching off other devices or nodes. The mesh network creates multiple routes for information to travel among connected nodes. This approach increases the resilience of the network in case of a node or connection failure. In a full mesh network, each node is connected directly to all the other nodes. In a partial mesh, only some nodes connect directly to one another. In some cases, a node must go through another node to reach a third node. The docking station devices 110 perform data transmission through this mesh network. The backend server 120 is communicatively connected to the access point AP and one or more of the docking station devices 110. Specifically, the backend server 120 is communicatively connected to the wireless sensor network transceiver circuit WSN1 of at least one docking station device 110, so the backend server 120 can transmit data or signal to the at least one docking station device 110 first and then transmit to other docking station devices 110 through the mesh network formed between the at least one docking station device 110 and the other docking station devices 110.

In practice, the docking station device 110 receives data from another device through the interface 112, the sensor 114, the wireless sensor network transceiver circuit WSN1, and/or the Wi-Fi transceiver circuit WFT1, and then transmits the received data according to the destination through the mesh network or the Internet. If the destination of data transmission is covered by the mesh network formed among the docking station devices, the data can be transmitted to the destination through the mesh network. If the destination of data transmission is not covered by the mesh network, the backend server 120 sends a selecting signal SS0 to the wireless sensor network transceiver circuit WSN1 of one docking station device 110 in order to select that docking station device as a hub node. The wireless sensor network transceiver circuit WSN1 of the docking station device 110 re-sends the selecting signal SS0 to its control circuit CTC1, and the control circuit CTC1 sends an activating signal AS0 to the Wi-Fi transceiver circuit WFT1 to activate the Wi-Fi of the docking station device 110, so that the docking station device 110 is now communicatively connected to the access point AP. By doing so, the data can be transmitted to the hub node through the mesh network first, and the hub node can then transmit data to the access point through Wi-Fi. Therefore, the data can be transmitted to a destination outside of the mesh network. The following paragraph describes the data transmission of the management system 200 through the use of embodiments.

Figure 4:
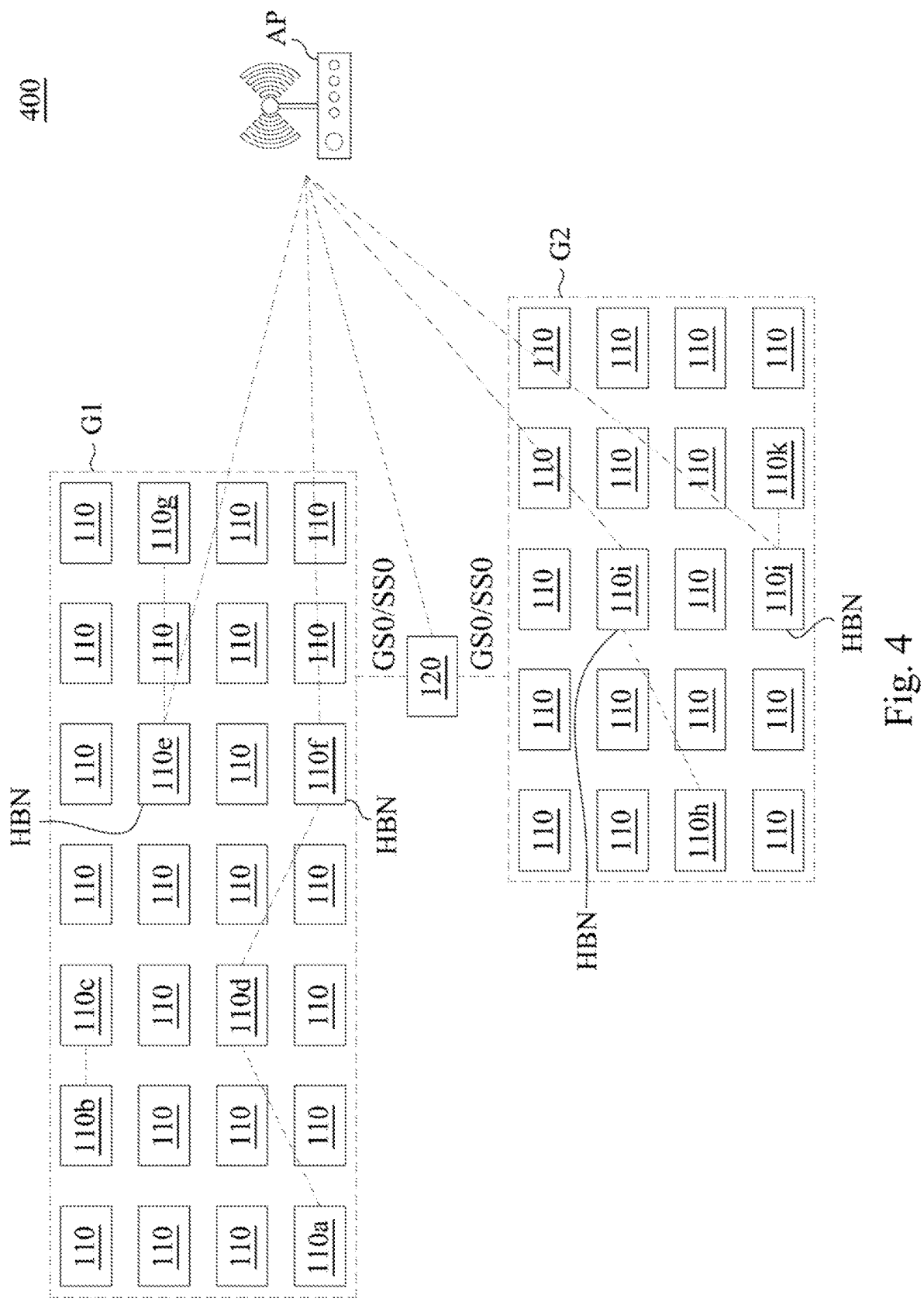
FIG. 4 is a schematic diagram of a management system in accordance with embodiments of the present disclosure.

The paragraphs above briefly describe the data transmission of the management system 200. The following paragraphs further describe how to transmit data combining the mesh network and the Internet. Please refer to FIG. 4. FIG. 4 is a schematic diagram of a management system 400 in accordance with embodiments of the present disclosure. The management system 400 includes two groups, G1 and G2, the backend server 120, and the access point AP. The backend server 120 and the access point AP are identical to the backend server 120 and the access point AP in the embodiment shown in FIG. 1, in terms of their functions and operations, and previous relevant descriptions can be referred to. In one embodiment, the management system 400 includes a plurality of access points AP. The group G1 includes 28 docking station devices 110, which include the docking stations 110a, 110b, 110c, 110d, 110e, 110f, and 110g. The group G2 includes 20 docking station devices 110, which include the docking stations 110h, 110i, 110j, and 110k. The docking station devices 110 in FIG. 4 are identical to the docking station devices 110 in the embodiment shown in FIG. 2 in terms of their functions and operations, and each of them has the interface 112, the sensor 114, the wireless sensor network transceiver circuit WSN1, the control circuit CTC1, and the Wi-Fi transceiver circuit WFT1 likewise. Previous relevant descriptions can be referred to.

In one embodiment, the docking station devices 110 in the group G1 are communicatively connected to each other to form a mesh network, and the docking station devices 110 in the group G2 are communicatively connected to each other to form the other mesh network. The backend server 120 is connected to the mesh networks of the groups G1 and G2. The backend server 120 sends out a grouping signal GS0 to all docking station devices 100 through these two mesh networks, and the docking station devices 110 are divided into the groups G1 and G2. In one embodiment, each of the groups G1 and G2 has the docking station devices 110 of less than N. In other words, the backend server 120 sends out the grouping signal GS0 and groups the docking station devices 110 according to the predetermined value of N, and when the total number of the docking station devices 110 exceeds N, the docking station devices 110 will be divided into different groups, for the purpose of better data transmission. For example, in the embodiment shown in FIG. 4, there are 48 docking station devices 110 in total. If N is set as 29, the backend server 120 transmits the grouping signal GS0 according to N and divides the docking station devices 110 into the group G1 (including 28 docking station devices 110) and the group G2 (including 20 docking station devices 110), respectively. The numbers of the docking station devices 110 in the groups G1 and G2 are both smaller than N, so there will not be further grouping.

In one embodiment, the backend server 120 generates the grouping signal GS0 according to a spatial database. The spatial database includes the distance and angular data of all docking station devices 110. In other words, the backend server 120 decides which docking station devices 110 should be put into the same group according to the relative locations and angles of the docking station devices 110. Take the embodiment shown in FIG. 4 as an example. The docking station devices 110 of the group G1 are close to each other, and the docking station devices 110 of the group G2 are close to each other, while the distance between the group G1 and the group G2 are relatively far.

In one embodiment, after the management system divides the docking station devices 110 into the groups G1 and G2, the backend server 120 sends out a selecting signal SS0 to multiple docking station devices 110 through the mesh networks of the groups G1 and G2 in order to select them as the hub nodes. The hub nodes are configured to receive data transmitted in a group, connect to the access point AP, and transmit data to outside the mesh network. Specifically, the backend server 120 transmits the selecting signal SS0 to a docking station device 110 in the group G1 and to a docking station device 110 in the group G2, and the selecting signal SS0 will be sent to all docking station devices 110 through the mesh networks of the groups G1 and G2. When the docking station devices 110 selected as the hub nodes receive the selecting signal SS0, their wireless sensor network transceiver circuits WSN1 will pass the selecting signal SS0 to the control circuits CTC1, and the control circuits CTC1 will transmit the activating signals AS0 to their Wi-Fi transceiver circuits WFT 1 to activate their Wi-Fi and connect to the access point AP.

For example, in the embodiment shown in FIG. 4, the docking station devices 110e and 110f are selected as the hub nodes HBN and connected to the access point AP communicatively, and the docking station devices 110i and 110j are selected as the hub nodes HBN and connected to the access point AP communicatively. In one embodiment, the hub nodes HBN are automatically selected by the backend server 120 by an algorithm according to strength and relay hops of a wireless signal received by each docking station device 110. In other words, the backend server 120 decides which docking station devices 110 in each group should be selected as the hub nodes HBN according to the strength of the signal received by each docking station device 110 during data transmission and the number of relay hops that are required to transmit data from one docking station device 110 to the other docking station device 110. By doing so, signals will have enough strength for data transmission, and the number of hops during data transmission can be reduced.

The following paragraphs describe the data transmission of the management system 400. In one embodiment, in the management system 400, data are to be transmitted from the docking station device 110 a in the group G1 to a docking station device 110 in the group G2. As shown in FIG. 4, the docking station device 110a transmits the data to the docking station device 110d first, the docking station device 110d transmits the data to the docking station device 110f, the docking station device 110f transmits the data to the access point AP, and the access point AP transmits the data to the hub node HBN in the group G2 (i.e., the docking station device 110i or 110j) through the Internet. The hub node HBN in the group G2 transmits the data to the destination through the mesh network of the group G2. In this embodiment, the docking station device 110d is used as a relay node and configured to receive and relay the data received from the docking station device 110a. The docking station device 110f is the hub node HBN of the group G1 and configured to collect the data in the group G1 and send them to the access point AP.

In one embodiment, in the management system 400, data are to be transmitted from the docking station 110b in the group G1 to a docking station device 110 in the group G2. As shown in FIG. 4, the docking station 110b transmits the data to the docking station device 110c first, the docking station device 110c transmits the data to the docking station device 110e, the docking station device 110e transmits the data to the access point AP, and the access point AP transmits the data to the mesh network of the group G2 through the Internet. In this embodiment, the docking station device 110c is used as a relay node and configured to receive and relay the data received from the docking station device 110b, and the docking station device 110e is the hub node HBN of the group G1 and configured to collect the data in the group G1 and send them to the access point AP. Although the docking station devices 110e and 110f are both hub nodes HBN in the group G1, the docking station device 110c is closer to the docking station device 110e, so the docking station device 110c transmits the data to the access point AP through the docking station device 110e, unlike the previous embodiment in which the data is transmitted to the access point AP through the docking station device 110f.

In one embodiment, in the management system 400, data are to be transmitted from the docking station 110g in the group G1 to a docking station device 110 in the group G2. As shown in FIG. 4, the docking station 110g transmits the data to the docking station device 110e first, the docking station device 110e transmits the data to the access point AP, and the access point AP transmits the data to the mesh network of the group G2 through the Internet. In this embodiment, the docking station device 110g directly sends the data to the docking station device 110e acting, which acts as the hub node HBN, and does not have to transmit the data to a relay node before transmitting the data to the hub node HBN in the group G1.

In one embodiment, in the management system 400, data are to be transmitted from a docking station device 110 in the group G1 to the docking station device 110h in the group G2. When the access point AP receives the data from the hub node HBN of the group G1, the access point transmits the data to the docking station device 110i through the Internet, and the docking station device 110i transmits the data to the docking station device 110h. In this embodiment, the Wi-Fi transceiver circuit WFT1 of the docking station device 110i is activated, and the docking station device 110i acts as the hub node HBN, so the docking station device 110i can receive the data from the access point AP through the Internet and transmit the data to the docking station device 110h through its wireless sensor network transceiver circuit WSN1.

In one embodiment, in the management system 400, data are to be transmitted from a docking station device 110 of the group G1 to the docking station device 110k of the group G2. When the access point AP receives data from the hub node HBN of the group G1, the access point AP transmits the data to the docking station device 110j of the group G2 through the Internet, and the docking station device 110j transmits the data to the docking station device 110k. In this embodiment, the Wi-Fi transceiver circuit WFT1 of the docking station device 110j is activated, and the docking station device 110j acts as the hub node HBN, so the docking station device 110j can receive data from the access point AP through the Internet and transmit data to the docking station device 110k through its wireless sensor network transceiver circuit WSN1. Although the docking station devices 110i and 110j are both hub nodes HBN in the group G2, the docking station device 110j is closer to the docking station device 110k, so the access point AP transmits the data to the docking station device 110j, unlike the previous embodiment in which the data is transmitted to the docking station device 110i.

In one embodiment, if the number of the hub nodes HBN is smaller than a minimum number of hub nodes, the backend server 120 selects one or more of the docking station devices 110 as new hub node(s) HBN. For example, when the minimum number of hub nodes is set as 3, the numbers of hub nodes HBN of the groups G1 and G2 are both less than the minimum number of hub nodes, so the backend server 120 will send out the selecting signal SS0 to all docking station devices 110 through the mesh networks of the groups G1 and G2, and a docking station device 110 of the group G1 and a docking station device 110 of the group G2 can be selected as the new hub nodes HBN.

In one embodiment, if any of the hub nodes HBN has a transmission loading greater than a transmission threshold, the backend server 120 selects one or more of the docking station devices 110 as the new hub node(s) HBN. For example, when any of the docking stations 110e, 110f, 110i, and 110j has a transmission loading greater than the predetermined transmission threshold, this situation will be reported to the backend server 120 through the mesh networks of the groups G1 and G2, and the backend server 120 will send out the selecting signal SS0 through the mesh networks of the groups G1 and G2, in order to select one or more of the docking station devices 110 as the new hub node(s) until the transmission loadings of all hub nodes HBN are no longer greater than the transmission threshold.

In conclusion, by using the docking station device 110 as the embodiments shown in FIG. 2 and FIG. 3 and applying the data transmission approach as the embodiment shown in FIG. 4, data can be transmitted through the mesh network and/or the Internet according to the starting point and destination, and thus efficient data transmission can be achieved.

Figure 5:
FIG. 5 is a flowchart of a management method in accordance with embodiments of the present disclosure.

The present disclosure also provides a method for controlling a mesh network. Please refer to both FIG. 4 and FIG. 5. FIG. 5 is a flowchart of a mesh network control method 500 in accordance with embodiments of the present disclosure. In one embodiment, the mesh network control method 500 includes steps S510 and S512. The mesh network control method 500 first determines whether there is an established spatial database (i.e., step S510) and, if no, creates the spatial database based on the distance and angular data of the nodes (i.e., step S512), wherein the spatial database is configured to divide the nodes into the groups. Take the embodiment shown in FIG. 4 as an example. The backend server 120 first determines whether there is a spatial database, and, if no, the backend server 120 receives the distance and angular information of the docking station devices 110 through the mesh network and creates the spatial database for the purpose of dividing the docking station devices 110 into the groups.

In one embodiment, if the spatial database has been established, the mesh network control method 500 includes determining whether the number of nodes is smaller than a predetermined minimum number N (i.e., step S520) and, if not, dividing the nodes into a plurality of groups (i.e., step S522), wherein each of the groups has the nodes of less than N. In other words, in the steps S520 and S522 the mesh network control method 500 divides the nodes into different groups according to the predetermined N so that the numbers of nodes in each group do not exceed N. Take the embodiment shown in FIG. 4 as an example. Before the docking station devices 110 are divided into the groups G1 and G2, there are 48 docking station devices 110 in the management system 400 in total. If N is set as 29, because the number of the docking station devices 110 is not less than N, the backend server 120 will transmit the group signal GS0 through the mesh networks and divide the docking station devices 110 into two groups, wherein each group has the docking station devices 110 of less than N. In one embodiment, the backend server 120 decides which docking station devices 110 should be put into the same group according to the spatial database described in the previous embodiment, and considers the distance and angular information while grouping. For example, in the embodiment shown in FIG. 4, the docking station devices that are closer to each other will be divided into the same group, and thus the groups G1 and G2 are formed.

Following the previous embodiment, the mesh network control method 500 includes selecting one or more of the nodes in each group as the hub node(s) (i.e., step S530) if the number of nodes is less than N or after dividing the nodes into different groups. The selection of hub nodes can be referred to previous relevant paragraphs describing the embodiment shown in FIG. 4. That is, the backend server 120 transmits the selecting signal SS0 to select the hub nodes HBN in the groups G1 and G2. In one embodiment, selecting nodes as hub nodes is performed by activating the Wi-Fi transceiver circuits WFT1 of each of the selected nodes. For example, in the embodiment shown in FIG. 2, when the backend server 120 transmits the selecting signal SS0 to the wireless sensor network transceiver circuit WSN1, the wireless sensor network transceiver circuit WSN1 sends the selecting signal SS0 to the control circuit CTC1, the control circuit CTC1 sends an activating signal AS0 to the Wi-Fi transceiver circuit WFT1 in order to activate the Wi-Fi of the docking station device 110 and use it as a hub node HBN.

Following the previous embodiment, the mesh network control method 500 includes determining whether the number of the hub nodes HBN in each group is smaller than a minimum number of hub nodes (i.e., step S540) and, if yes, selecting one or more of the nodes as the new hub node(s) HBN (i.e., in FIG. 5, if the answer for the determination in step S540 is yes, then go back to step S530 to select the new hub nodes again), wherein the minimum number of hub nodes is a predetermined number of nodes in a group. Take the embodiment as shown in FIG. 4 as an example. If the minimum number of hub nodes is set as 3, because each of the groups G1 and G2 has 2 hub nodes, the backend server 120 transmits the selecting signal through the mesh networks to select the new hub nodes HBN from the groups G1 and G2.

Following the previous embodiment, the mesh network control method 500 optionally includes finding relay nodes for each group according to the relay hops of each node (i.e., step S550) if the number of hub nodes HBN in each group is smaller than the minimum number of hub nodes. Take the embodiment as shown in FIG. 4 as an example. Along the path that the data is transmitted from the docking station device 110a to the access point AP, before the data is transmitted to the hub node HBN ((i.e., the docking station device 110f), the data is transmitted to the docking station device 110d, where the data will be further relayed. The node between the starting point of data transmission (i.e., the docking station device 110a) and the hub node HBN is referred to as the relay node. However, relay node is not always required along the path of data transmission. For example, the docking station device 110g can transmit data to the hub node HBN (i.e., the docking station device 110e) directly, and the docking station device 110i can transmit data to the hub node HBN (i.e., the docking station device 110h) directly, too. No relay node is required in these two examples.

Following the previous embodiment, the mesh network control method 500 may include determining whether any of the hub nodes HBN has a transmission loading greater than a transmission threshold (i.e., step S560) and, if yes, selecting one or more of the nodes as the new hub node(s) HBN (that is, as FIG. 4 shows, if the answer for the determination in step S560 is yes, then go back to step S530 to select the new hub nodes again). In other words, if the transmission loadings of the hub nodes HBN exceed the transmission threshold, the mesh network control method 500 will select the new hub nodes HBN according to the previous description of the embodiment shown in FIG. 4, in order to reduce the transmission loading of the hub nodes HBN until each hub node HBN has a transmission loading not greater than the transmission threshold.

By taking the steps mentioned above, the mesh network control method 500 implements a network configuration that is suitable for data transmission among the nodes. In one embodiment, the mesh network control method 500 can adjust N, the minimum number of hub nodes, and/or the transmission threshold according to actual need and repeat the corresponding steps.

In conclusion, the mesh network control method 500 uses the steps S510~S560 to decide the grouping of nodes, select nodes as hub nodes HBN for data transmission, and add new hub nodes HBN when hub nodes are less than the minimum number of hub nodes or when the transmission loading of a hub node HBN is too heavy. Therefore, efficient data transmission can be achieved through the mesh networks and the Internet.

Figure 6A:
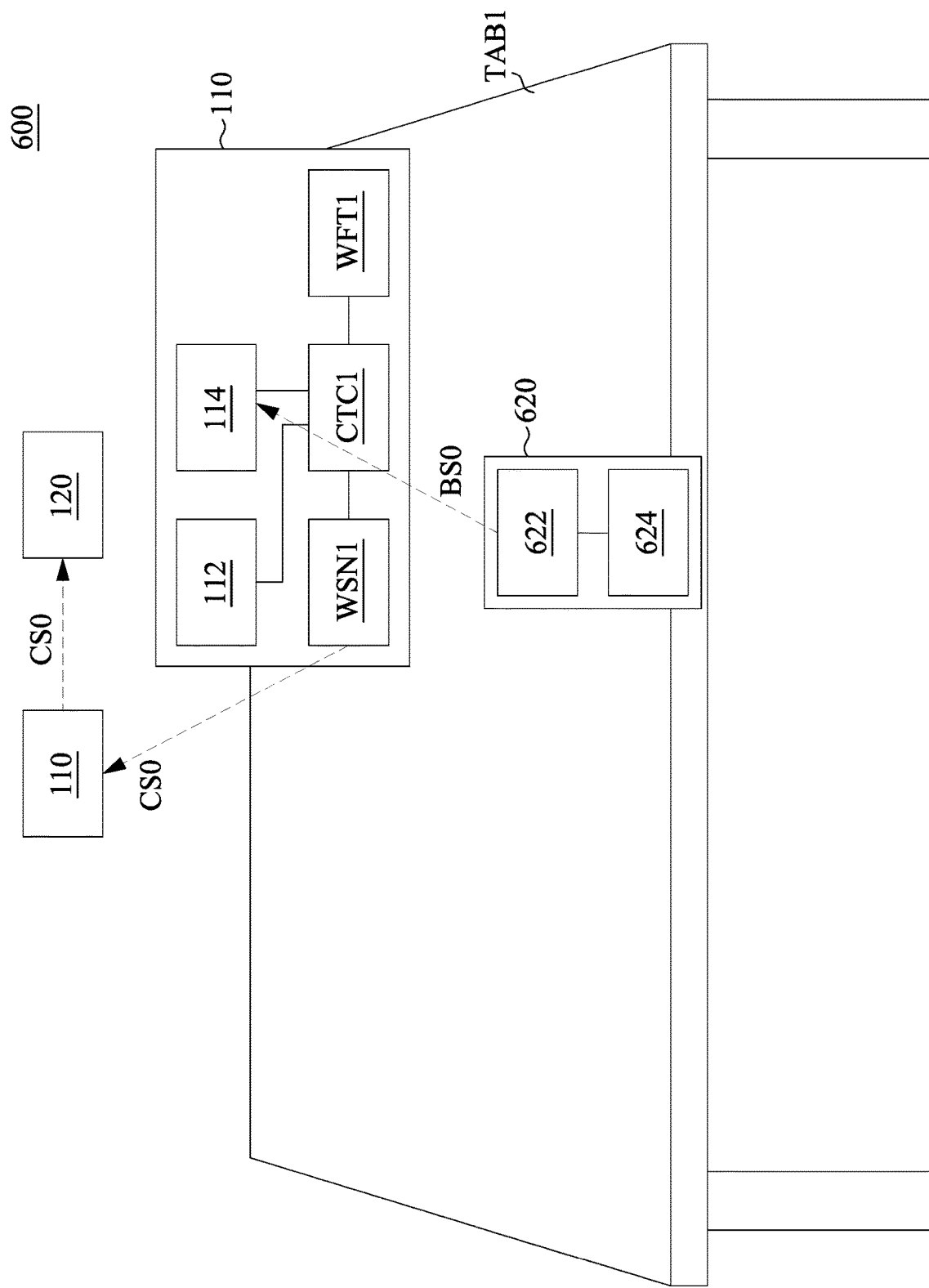
FIG. 6A is a schematic diagram of a management system in accordance with embodiments of the present disclosure.

The present disclosure also provides another management system. Please refer to FIG. 6A. FIG. 6A is a schematic diagram of a management system 600 in accordance with embodiments of the present disclosure. The management system 600 includes a beacon tag device 620, a docking station device 110, and a backend server 120. The beacon tag device 620 includes a wireless communication chip 622 and a processor 624. The wireless communication chip 622 is configured to transmit a beacon signal BS0. The docking station device 110 includes an interface 112, a sensor 114, a wireless sensor network transceiver circuit WSN1, a Wi-Fi transceiver circuit WFT1, and a control circuit CTC1. The interface 112 is configured to couple to one or a plurality of electronic devices. The sensor 114 is configured to receive the beacon signal BS0. The wireless sensor network transceiver circuit WSN1 is configured to receive and transmit data primarily according to a short-distance or low-energy wireless network communication protocol. The Wi-Fi transceiver circuit WFT1 is configured to receive and transmit data according to a Wi-Fi protocol. The control circuit CTC1 is coupled to the interface 112, the sensor 114, the wireless sensor network transceiver circuit WSN1, and the Wi-Fi transceiver circuit WFT1. The backend server 120 is communicatively connected to the docking station device 110. The docking station device 110 and the backend server 120 of the embodiment shown in FIG. 6A are similar to the docking station device 110 and the backend server 120 of the embodiment shown in FIG. 2, in terms of their structures. Previous relevant paragraphs can be referred to. In one embodiment, the control circuit CTC1 and the other components are embedded or implemented in a device different from a docking device, and the function of the present disclosure can still be performed.

The docking station device 110 can connect to the backend server 120 directly or through the other docking station devices 110 and the mesh network. Previous paragraphs describing the embodiments of mesh network control system and method can be referred to. In one embodiment, the docking station device 110 is indirectly connected to the backend server 120 through another docking station device, as shown in FIG. 6A.

The following paragraphs further describe the management system 600 in FIG. 6A. In FIG. 6A, the docking station device 110 is placed on the table TAB1, and a user (e.g., an employee of a company or a user attempting to reserve a table or meeting room) holds the beacon tag device 620 and approaches the table TAB1 and the docking station device 110. The table TAB1 and the docking station device 110 in FIG. 6A represent the table TAB1 and the docking station device 110 in FIG. 1. In other words, the management system 600 is implemented in a scenario like the embodiment shown in FIG. 1. That is, the user is in a building used as a workspace and is holding the beacon tag device 620 while approaching to the docking station device 110 on the table TAB1 in order to check in or out to the docking station device 110.

Please refer to FIG. 6A again. The wireless communication chip 622 on the beacon tag device 620 transmits the beacon signal BS0, and when the sensor 114 receives the beacon signal BS0, the control circuit CTC1 determines whether the received signal strength indication (RSSI) of the beacon signal BS0 is greater than a beacon strength threshold, wherein the beacon strength threshold is a value predetermined by the system. In one embodiment, a company's manager can set the beacon strength threshold through the backend server 120 and its connection to the docking station device 110. If the control circuit CTC1 determines that the RSSI of the beacon signal BS0 is greater than the beacon strength threshold, the control circuit CTC1 transmits a check-in/check-out signal CS0 to the wireless sensor network transceiver circuit WSN1, and the wireless sensor network transceiver circuit WSN1 transmits the check-in/check-out signal CS0 to the backend server 120. In one embodiment, as shown in FIG. 6A, the docking station device 110 is indirectly connected to the backend server 120 through another docking station device, which is selected as a hub node. In terms of hub nodes and their selection, previous embodiments (e.g., the embodiment shown in FIG. 4) can be referred to. In this embodiment, after the control circuit CTC1 of the docking station device 110 transmits the check-in/check-out signal CS0 to its wireless sensor network transceiver circuit WSN1, the wireless sensor network transceiver circuit WSN1 transmits the check-in/check-out signal CS0 to the wireless sensor network transceiver circuit WSN1 of another docking station device 110 through the mesh network formed between the two docking station devices 110. Then, another docking station device 110 transmits the check-in/check-out signal CS0 to the backend server 120 through its Wi-Fi transceiver circuit WFT1. The backend server 120 records the time that the user checks in or out according to the check-in/check-out signal CS0. By doing so, the user completes a check-in or check-out through the use of the management system 600.

Figure 6B:
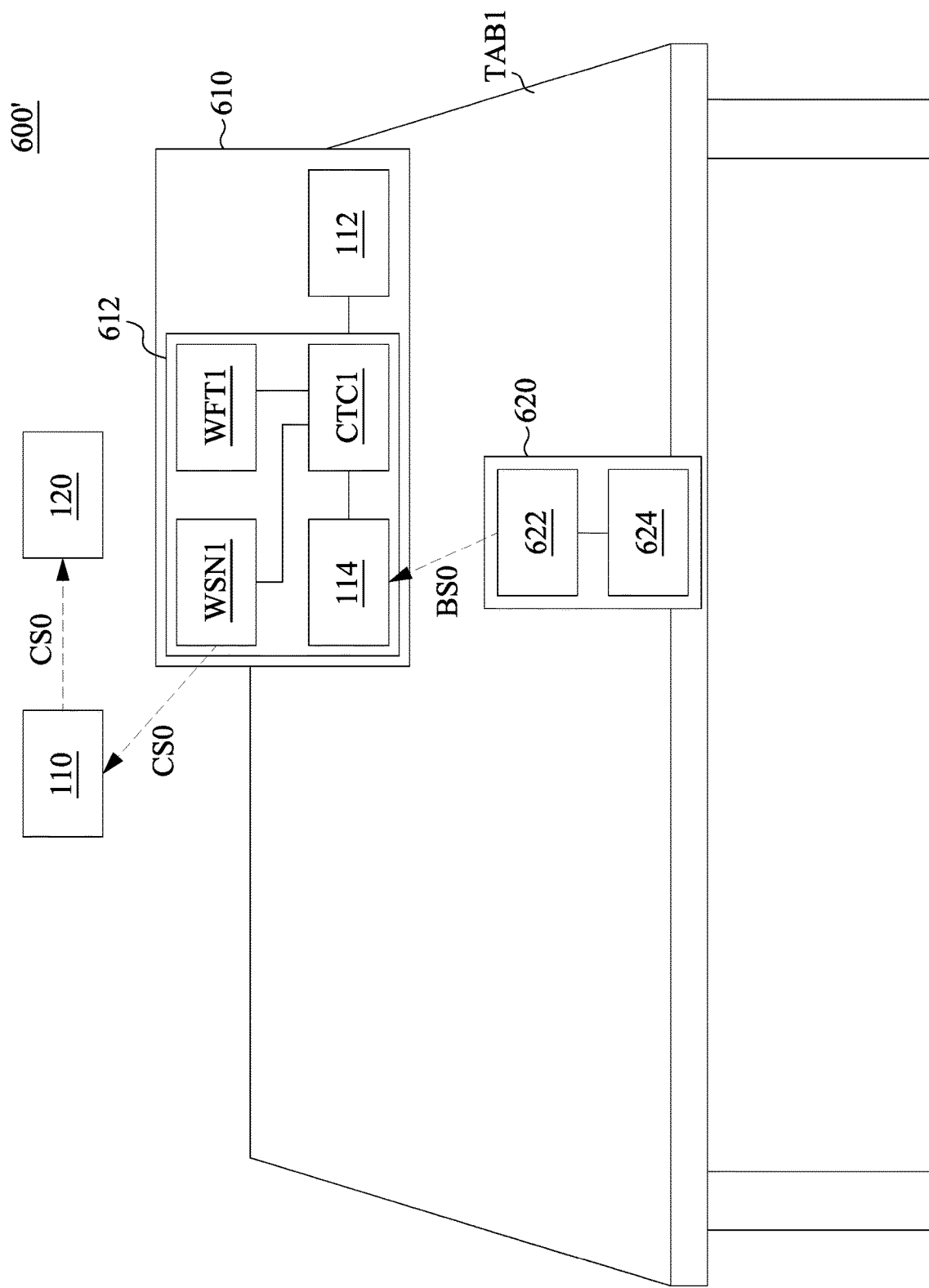
FIG. 6B is a schematic diagram of a management system in accordance with embodiments of the present disclosure.

The present disclosure also provides a module board. Please refer to FIG. 6B. FIG. 6B is a schematic diagram of a management system 600' in accordance with embodiments of the present disclosure. The management system 600' includes a beacon tag device 620, an electronic device 610, and a backend server 120. The electronic device 610 includes a module board 612 and an interface 112. The module board 612 includes a sensor 114, a wireless sensor network transceiver circuit WSN1, a Wi-Fi transceiver circuit WFT1, and a control circuit CTC1. The beacon tag device 620, the backend server 120, the interface 112, the sensor 114, the wireless sensor network transceiver circuit WSN1, the Wi-Fi transceiver circuit WFT1, and the control circuit CTC1 in the embodiment shown in FIG. 6B are identical or similar to their counterparts in the embodiment shown in FIG. 6A, in terms of their functions and operations.

In one embodiment, the electronic device 610 is an Internet-of-Thing device, and the module board 612 is configured to be inserted into the electronic device 610, receive the beacon signal BS0 from the beacon tag device 620, and transmit the check-in/check-out signal CS0 directly or indirectly to the backend server 120. In other words, the module board 612, when being inserted into the electronic device 610, enables the electronic device 610 to perform the check-in and check-out function as the docking station device 110 does in the embodiment shown in FIG. 6A. In one embodiment, the module board 612 is in a form of a card which is designed to be inserted into and connected to the electronic device 610 through the interface 112. It should be noted that the interface 112 is included in the electronic device 610 but not in the module board 612.

Please refer to FIG. 6A again. In one embodiment, the management system 600 includes multiple docking station devices 110 (as the embodiment shown in FIG. 1), and the beacon strength thresholds of these docking station devices 110 are set to be different, so that different beacon tag devices 620 can check in or out to different docking station devices 110. In one embodiment, the beacon signal BS0 includes the user's identification code, and the docking station device 110 includes the user's reservation data. The docking station device 110 will confirm that the seat or table is the one reserved by the user according to the identification code and the reservation data before performing check-in or check-out.

In one embodiment, the wireless communication chip 622 of the beacon tag device 620 transmits the beacon signal BS0 at a specific beacon interval. In other words, the wireless communication chip 622 sends out the beacon signal BS0 every beacon interval. Whenever the wireless communication chip 622 transmits the beacon signal BS0, the sensor 114 of the docking station device 110 will receive the beacon signal BS0, determine whether the beacon signal BS0 is greater than the beacon strength threshold, and, if yes, send the check-in/check-out signal CS0 to the backend server 120. In one embodiment, the wireless communication chip 622 transmits the beacon signal BS0 periodically in a low-power way. In the previous two embodiments, because the wireless communication chip 622 transmits the beacon signal BS0 periodically, the manager of the company can obtain a series of check-in/check-out signals through the backend server 120, know whether the user is seated at the table at a specific time or during a specific period, and thus better understand staff's whereabouts. In other words, in one embodiment, when the user checks in (i.e., the docking station device 110 has determined that the beacon signal BS0 is greater than the beacon strength threshold), the beacon tag device 620 is bound to the docking station device 110, and the docking station device 110 will make sure that whether the beacon signal BS0 received periodically is greater than the beacon strength threshold. If yes, then the docking station device 110 determines that the status of the seat is "occupancy." In one embodiment, after the beacon tag device 620 has been bound to the docking station device 110, if the docking station device 110 does not sense any beacon signal BS0 greater than the beacon strength threshold in a predetermined period of time, the docking station device 110 determines that the status of the seat is "auto check-out."

In one embodiment, the beacon tag device 620 further includes a short-distance detector. Please refer to both FIG. 6A and FIG. 7. FIG. 7 is a schematic diagram of a beacon tag device 620 in accordance with embodiments of the present disclosure. The upper part of FIG. 7 shows a part of the docking station device 110 shown in FIG. 6A (or the electronic device 610 shown in FIG. 6B). The docking station device 110 is briefly illustrated in FIG. 7 in order to show the relative positions of the docking station device 110 and the beacon tag device 620. In the embodiment shown in FIG. 7, the beacon tag device 620 includes a short-distance detector 626 other than the wireless communication chip 622 and the processor 624. When the short-distance detector 626 senses the docking station device 110 within a sending distance SD0 (i.e., within the dotted circular area in FIG. 7 that is centered on the short-distance detector 626 with radius of the sending distance SD0), the short-distance detector 626 transmits a driving signal DS0 to the processor 624, and the processor 624 drives the wireless communication chip 622 to transmit the beacon signal BS0. In other words, the wireless communication chip 622 does not always or periodically transmit the beacon signal BS0 but only transmit the beacon signal BS0 when the docking station device 110 is sensed within a short distance.

Please refer to FIG. 6A again. In one embodiment, the beacon tag device 620 further includes a transmission button. When the user presses the transmission button on the beacon tag device 620, the wireless communication chip 622 transmits the beacon signal BS0. In this embodiment, because the wireless communication chip 622 transmits the beacon signal BS0 only when the transmission button is pressed, the power consumption is reduced.

In one embodiment, the docking station device 110 further includes an activating button, configured to activate the sensor 114. Specifically, when the activating button is pressed, the sensor 114 is in an activated mode and can sense the beacon signal BS0 during a specific period of time. In this embodiment, because the sensor 114 starts to receive the beacon signal BS0 only when the activating button is pressed, the power consumption of the sensor 114 is reduced.

In one embodiment, the docking station device 110 further includes a display monitor. The display monitor is coupled to the wireless sensor network transceiver circuit WSN1, and information of the table that the docking station device 110 is mounted on is shown on the display monitor. The backend server 120 directly or indirectly transmits the information of the table (hereinafter referred to as table information) to the wireless sensor network transceiver circuit WSN1, and the wireless sensor network transceiver circuit WSN1 transmits the table information to the display monitor. The table information includes the name of the person who checks in to or reserves the table, the number of the table, and/or the availability of the table. In one embodiment, the display monitor shows that the table is unavailable based on uncleanness of the table or other concerns, e.g., social distancing. In one embodiment, the table information includes table location, current time, and/or network connection status of the table. In one embodiment, the table information is set up through the backend server 120.

Following the previous embodiment, in one embodiment, the table information further includes a two-dimensional barcode which is configured to assist the user in checking in or out. In one embodiment, the two-dimensional barcode is a quick response code (QR code). Specifically, when the user scans the two-dimensional barcode through a mobile device (e.g., a cell phone), the mobile device will transmit data to the backend server 120, and the backend server 120 will perform check-in or check-out in response to the data.

Figure 8:
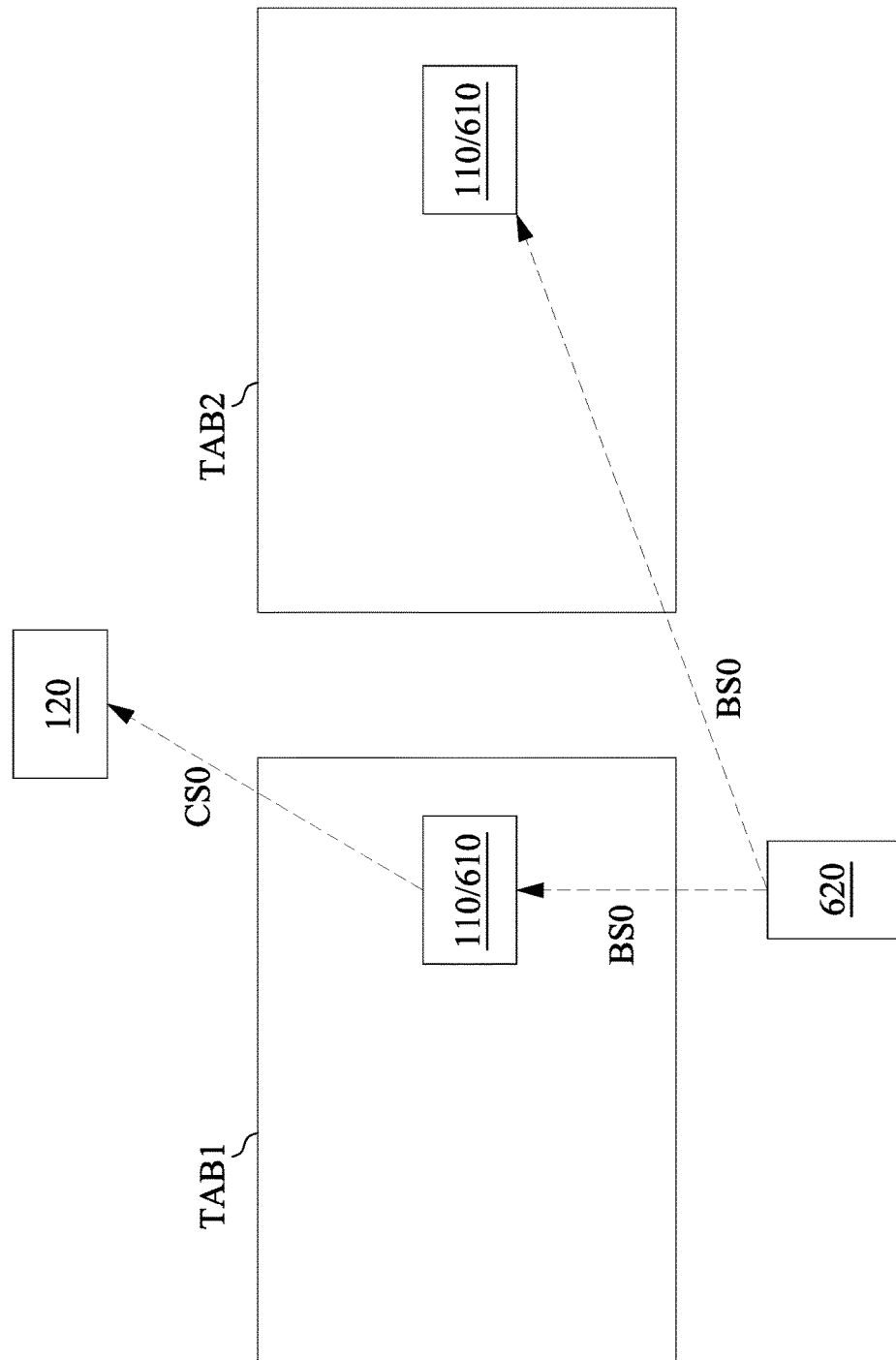
FIG. 8 is a schematic diagram of a management system in accordance with embodiments of the present disclosure.

The following paragraphs further describe the actual operation of the embodiments mentioned above. Please refer to both FIG. 1 and FIG. 8. FIG. 8 is a schematic diagram of a management system 800 in accordance with embodiments of the present disclosure. The tables TAB1 and TAB2 of the embodiment as shown in FIG. 8 represent two tables placed in a building used as a workspace, and each of them has the docking station device 110 mounted on it, as the tables TAB1 and TAB2 do in FIG. 1. If the beacon strength thresholds of the docking station devices 110 on the tables TAB1 and TAB2 are set to have the same value, when the beacon tag device 620, which is closer to the table TAB1, sends out the beacon signal BS0, the docking station device 110 on the table TAB1 receives the beacon signal BS0 with a strength greater than the beacon strength threshold and thus transmits the check-in/check-out signal CS0 to the backend server 120. On the other hand, because the beacon tag device 620 is further from the docking station device 110 on the table TAB2, the docking station device 110 on the table TAB2 receives the beacon signal BS0 with strength less than the beacon strength threshold, and the docking station device 110 on table TAB2 will not transmit the check-in/check-out signal CS0 to the backend server. In this case, the user holding the tag device 620 completes a check-in or check-out to the table TAB1 and does not check in or out to the table TAB2.

In conclusion, in the previous embodiments, the docking station device 110 receives the beacon signal from the beacon tag device 620 through the sensor 114 and uses the control circuit CTC1 to determine whether the RSSI of the beacon signal BS0 is greater than the beacon strength threshold. Therefore, the docking station device 110 can assist the staff to check in or out.

Figure 9:
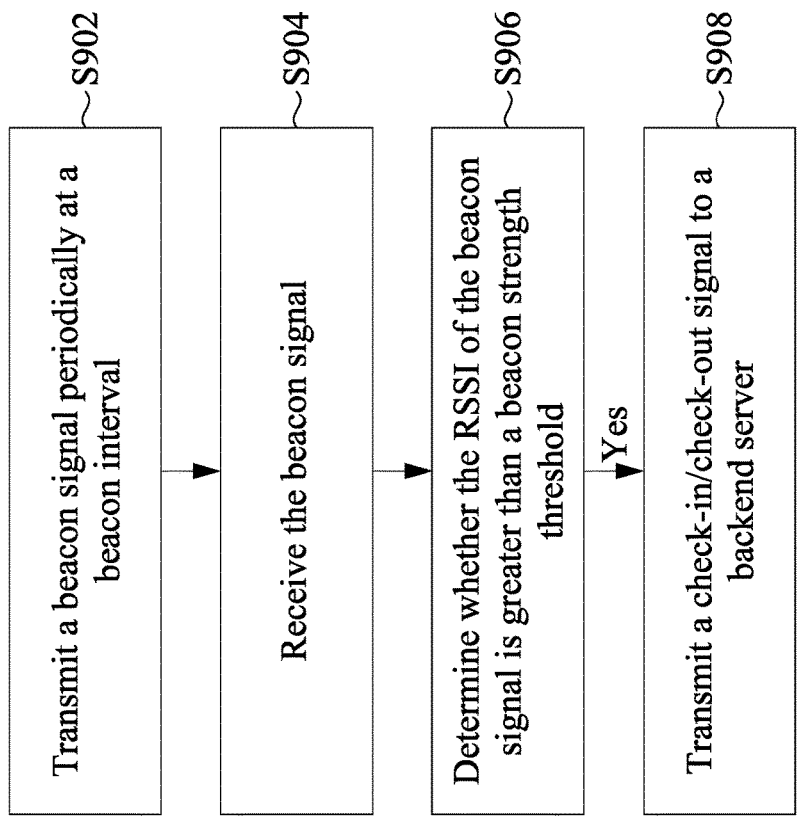
FIG. 9 is a flowchart of a management method in accordance with embodiments of the present disclosure.

The present disclosure also provides another management method. Please refer to FIG. 9. FIG. 9 is a flowchart of a management method 900 in accordance with embodiments of the present disclosure. The management method 900 includes: transmitting a beacon signal periodically at a beacon interval (i.e., step S902); receiving the beacon signal (i.e., step S904); and determining whether the RSSI of the beacon signal is greater than a beacon strength threshold (i.e., step S906) and, if so, transmitting a check-in/check-out signal to a backend server (i.e., step S908). In one embodiment, the management method 900 includes setting or adjusting the beacon strength threshold.

Figure 10:
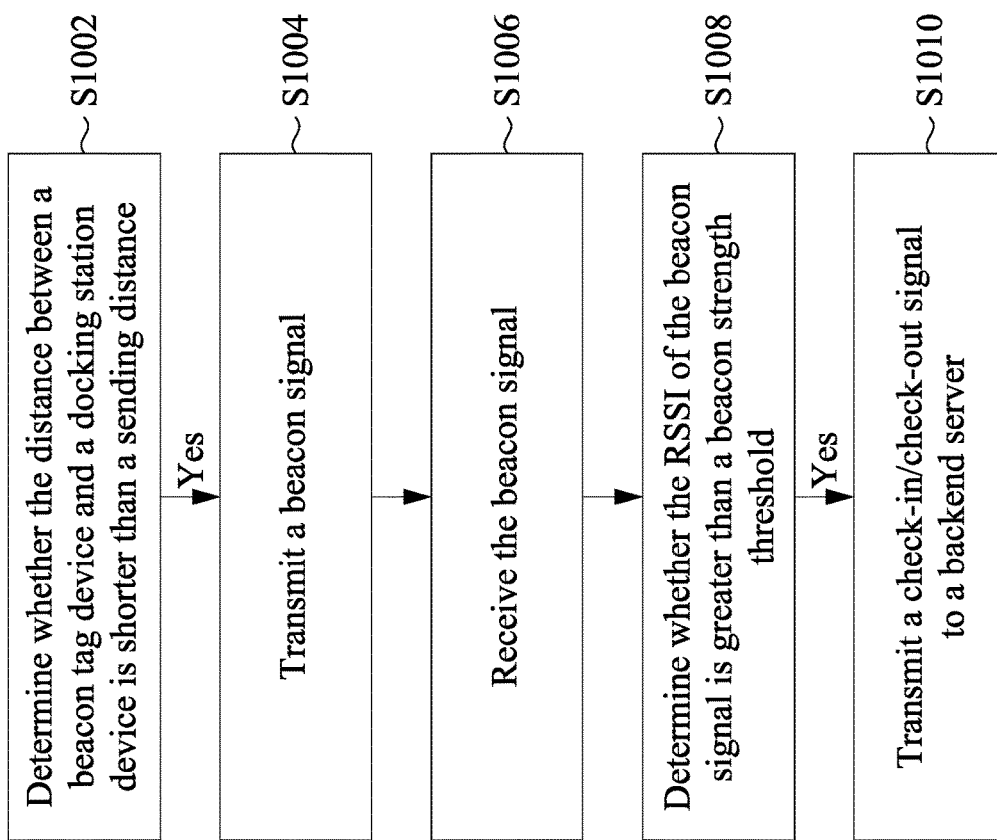
FIG. 10 is a flowchart of a management method in accordance with embodiments of the present disclosure.

The present disclosure also provides another management method. Please refer to FIG. 10. FIG. 10 is a flowchart of a management method 1000 in accordance with embodiments of the present disclosure. The management method 1000 includes: determining whether a distance between a beacon tag device and a docking station device is shorter than a sending distance (i.e., step S1002) and, if so, transmitting a beacon signal (i.e., step S1004); receiving the beacon signal (i.e., step S1006); and determining whether the RSSI of the beacon signal is greater than a beacon strength threshold (i.e., step S1008) and, if so, transmitting a check-in/check-out signal to a backend server (i.e., step 1010).

Figure 11:
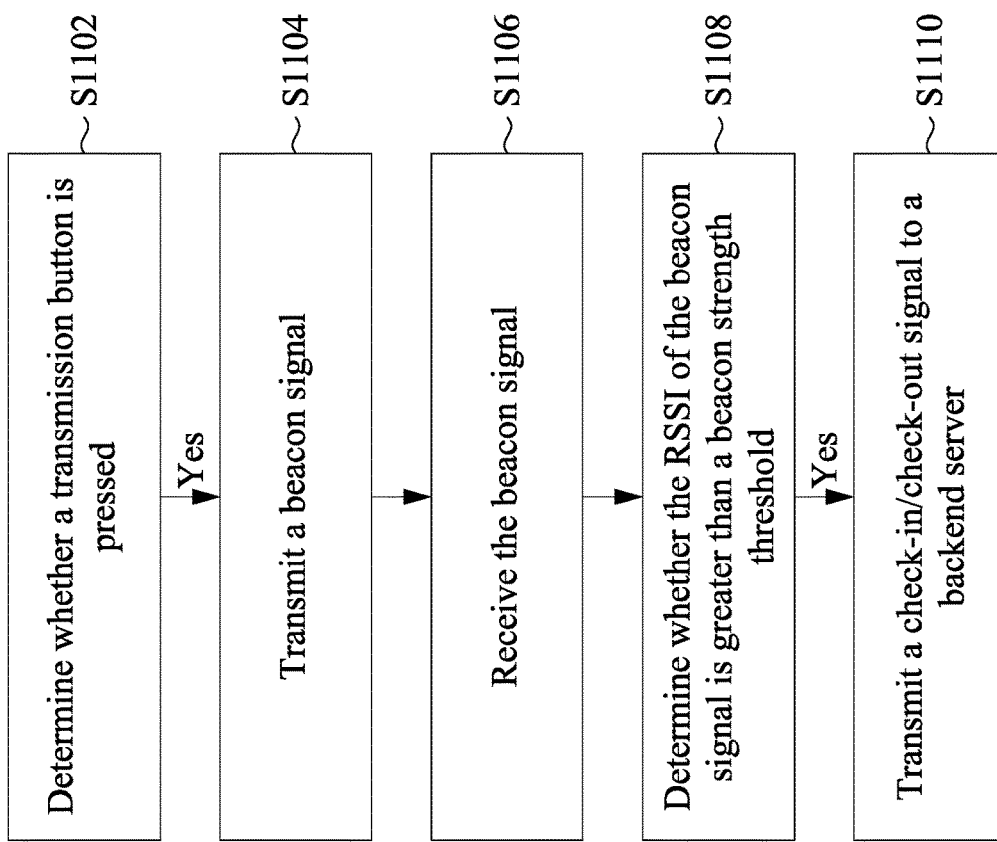
FIG. 11 is a flowchart of a management method in accordance with embodiments of the present disclosure.

The present disclosure also provides another management method. Please refer to FIG. 11. FIG. 11 is a flowchart of a management method 1100 in accordance with embodiments of the present disclosure. The management method 1100 includes: determining whether a transmission button is pressed (i.e., step S1102) and, if so, transmitting a beacon signal (i.e., step S1104); receiving the beacon signal (i.e., step S1106); and determining whether the RSSI of the beacon signal is greater than a beacon strength threshold (i.e., step S1108) and, if so, transmitting a check-in/check-out signal to a backend server (i.e., step S1110). In other words, in this embodiment, the beacon signal is transmitted only when the transmission button is pressed.

In one embodiment, the management method 110 further includes determining whether the activating button is pressed and, if so, receiving the beacon signal during a specific period of time. In other words, in this embodiment, the management method 1100 starts to receive the beacon signal only when the activating button is pressed.

In conclusion, the previous embodiments use the transmission and receipt of the beacon signal to implement the check-in or check-out of the staff.

Figure 12:
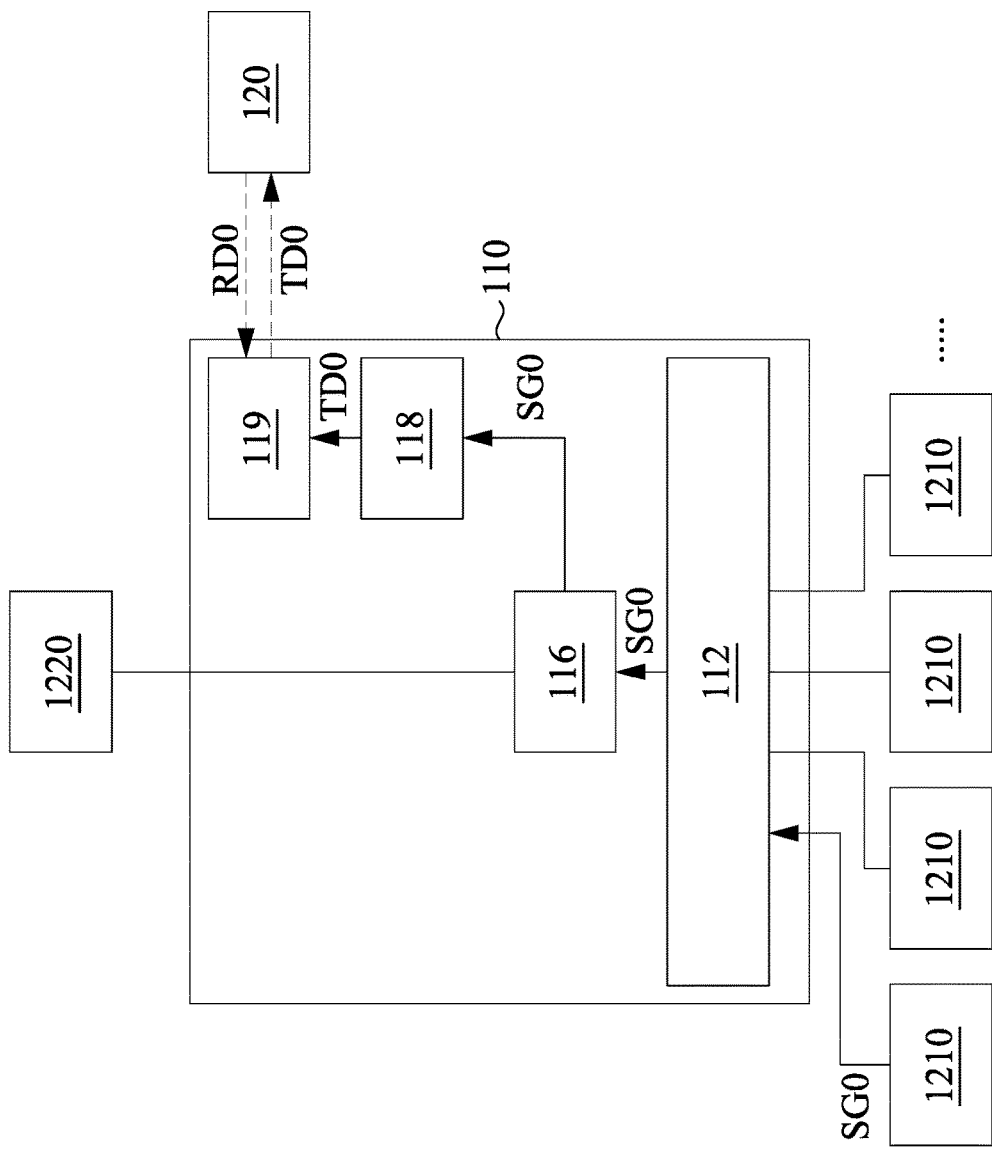
FIG. 12 is a schematic diagram of a management system in accordance with embodiments of the present disclosure.

The present disclosure also provides the other management system. Please refer to FIG. 12. FIG. 12 is a schematic diagram of a management system 1200 in accordance with embodiments of the present disclosure. The management system 1200 includes a docking station device 110 and a backend server 120. The docking station device 110 includes an interface 112, a hub controller 116, a System-on-a-Chip (SoC) control circuit 118, and an Internet-of-Thing (IoT) transceiver circuit 119. The interface 112 is configured to receive a signal SG0 of an electronic device 1210. The hub controller 116 is coupled to the interface 112 and a host 1220 and is configured to manage the signal transmission between the electronic device 1210 and the host 1220. The System-on-a-Chip control circuit 118 is coupled to the hub controller 116 and is configured to perform an operating system to determine the type of the electronic device 1220. The Internet-of-Thing transceiver circuit 119 is coupled to the System-on-a-Chip control circuit 118. The backend server 120 is communicatively connected to the Internet-of-Thing transceiver circuit 119. The backend server 120 includes permission data.

In the management system 1200, the docking station device 110 is coupled to the electronic device 1210 through the interface 112. In one embodiment, the electronic device is a keyboard, a mouse, an earphone, a cell phone, a laptop, a monitor, or a universal serial bus (USB) device. In one embodiment, the interface 112 has multiple input/output ports and thus can couple to a plurality of electronic devices 1210.

When the interface 112 receives the signal SG0 from the electronic device 1210, the hub controller 116 of the docking station device 110 determines whether the electronic device has high transmission speed according to the signal SG0. If not, the hub controller 116 allows the signal transmission between the electronic device 1210 and the host 1220 immediately. In other words, if the hub controller 116 identifies the electronic device 1210 as a Low-Speed or Full-Speed device (e.g., a mouse or keyboard that normally has low transmission speed), the hub controller 116 determines that the electronic device 1210 has low transmission speed. In this case, the hub controller 116 allows the electronic device 112 to access the host 1220. On the contrary, if the hub controller 116 identifies the electronic device 1210 as a Hi-Speed or SuperSpeed device (e.g., a storage or electromagnetic device for storage that normally has high transmission speed), the hub controller 116 determines that the electronic device 1210 has high transmission speed. In this case, subsequent determining steps will be performed. A storage device or electromagnetic device usually has high transmission speed and might be used to steal company's data, while a device like a mouse or keyboard usually has low transmission data. Therefore, through the approach described above, a device like a mouse or keyboard will be allowed to access the host 1220 immediately without further determination.

In one embodiment, if the electronic device 1210 is connected to the interface 112 through a specific input/output port, the hub controller 116 immediately allows the signal transmission between the electronic 1210 and the host 1220, without determining the transmission speed of the electronic device 1210. For example, when the electronic device 1210 is connected to the interface 112 through the display port or HDMI port of the interface 112, because the electronic device 1210 is a display device that is unlikely to be used to steal company's data or secret or damage company's computer, the hub controller 116 allows the electronic device 1210 that is connected to the interface 112 through such input/output ports. In one embodiment, a white list is predetermined in order to assist the hub controller 116 to identify those electronic devices 1210 of which the access to the host 1220 can be allowed immediately without further determination.

Further, if the hub controller 116 determines that the electronic device 1210 has high transmission speed, as shown in FIG. 12, the hub controller 116 further transmits the signal SG0 to the System-on-a-Chip control circuit 118, and the System-on-a-Chip control circuit 118 determines the type of the electronic device 1210 according to the signal SG0 and generates type data TD0. Specifically, the System-on-a-Chip control circuit 118 includes an embedded operating system configured to determine the type of electronic device 1210. The type data TD0 are information relating to the type of the electronic device 1210 and will be used in subsequent determining steps. In one embodiment, the System-on-a-Chip control circuit 118 is the control circuit CTC1 of the embodiment shown in FIG. 2. In one embodiment, the System-on-a-Chip control circuit 118 and the other components are embedded or implemented in a device different from a docking device, and the function of the present disclosure can still be performed.

After the System-on-a-Chip control circuit 118 determines the type of the electronic device 1210 and generates the type data TD0, the System-on-a-Chip control circuit 118 transmits the type data TD0 to the Internet-of-Thing transceiver circuit 119, and the Internet-of-Thing transceiver circuit 119 transmits the type data TD0 to the backend server 120. In one embodiment, the Internet-of-Thing transceiver circuit 119 is the wireless sensor network transceiver circuit WSN1 of the embodiment shown in FIG. 2 and uses the mesh network of the embodiment shown in FIG. 3 to communicatively connect to the backend server 120.

The backend server 120 determines whether the electronic device 1210 has the permission to access the host 1220 according to the type data TD0 and the permission data and sends back result data RD0 to the docking station device 110. Specifically, the manager of the company sets up through the backend server 120 the electronic devices 1210 that can access and perform data transmission with the host 1220 in advance. That is, the manager decides in advance the types of electronic devices 1210 that a particular employee can plug into the host 1220.

When the backend server 120 receives the type data TD0 from the Internet-of-Thing transceiver circuit 119 of the docking station device 110, the backend server 120 compares the type data TD0 with the permission data and determines whether the electronic device 1210 should be allowed to connect to the host 1220 according to the type of the electronic device 1210. After the determination is completed, the backend server 120 sends back the result of the determination, in the form of the result data RD0, to the Internet-of-Thing transceiver circuit 119, and the components in the docking station device 110 conduct subsequent steps through their coupling relationship (That is, the Internet-of-Thing transceiver circuit 119 is coupled to the System-on-a-Chip system control circuit 118, and the System-on-a-Chip system control circuit 118 is coupled to the hub controller 116.). In one embodiment, the company's manager can modify the permission data stored in the backend server 120 to change the type of devices that the host 1220 is allowed to connect to.

If the electronic device 1210 has the permission to access the host 1220 according to the result data RD0, the hub controller 116 permits the signal transmission between the electronic device 1210 and the host 1220. On the other hand, if the electronic device 1210 does not have the permission to access the host 1220 according to the result data RD0, the hub controller 116 does not permit the signal transmission between the electronic device 1210 and the host 1220. In other words, the hub controller 116 determines whether to allow the electronic device 1210 to access the host 1220 after receiving the result data RD0. If the result data RD0 shows that the electronic device 1210 does not have the permission to access the host 1220, the hub controller 116 will not allow the connection of the line between the hub controller 116 and the host 1220 (i.e., the straight line in FIG. 12 that connects the hub controller 116 and the host 1220), and the electronic device 1210 cannot access the data stored in the host 1220. On the contrary, if the result data RD0 shows that the electronic device 1210 has the permission to access the host 1220, the hub controller 116 will allow the connection of the line between the hub controller 116 and the host 1220, so that the user can access the data stored in the host 1220 through the electronic device 1210.

In one embodiment, as shown in FIG. 12, the interface 112 receives a plurality of signals SG0 from a plurality of electronic devices 1210 at the same time, and the docking station device 110 and the backend server 120 determine whether the signal transmissions between each of the electronic devices 1210 and the host 1220 should be allowed separately. In other words, users sometimes may attempt to connect multiple electronic devices 1210 to the host 1220 through the docking station device 110, and in such case the docking station device 110 can determine, separately and simultaneously, whether to allow these electronic devices 1210 to access the host 1220.

In conclusion, the management system 1200 allows devices having lower transmission speed to access the host 1220 immediately, determines the types of the devices having higher transmission speed, and determines whether to allow the host 1220 to connect to these devices according to the predetermined permission data, in order to reduce the risk that people outside the company might use plug-in devices to steal company's data or to damage company's computers.

Figure 13:
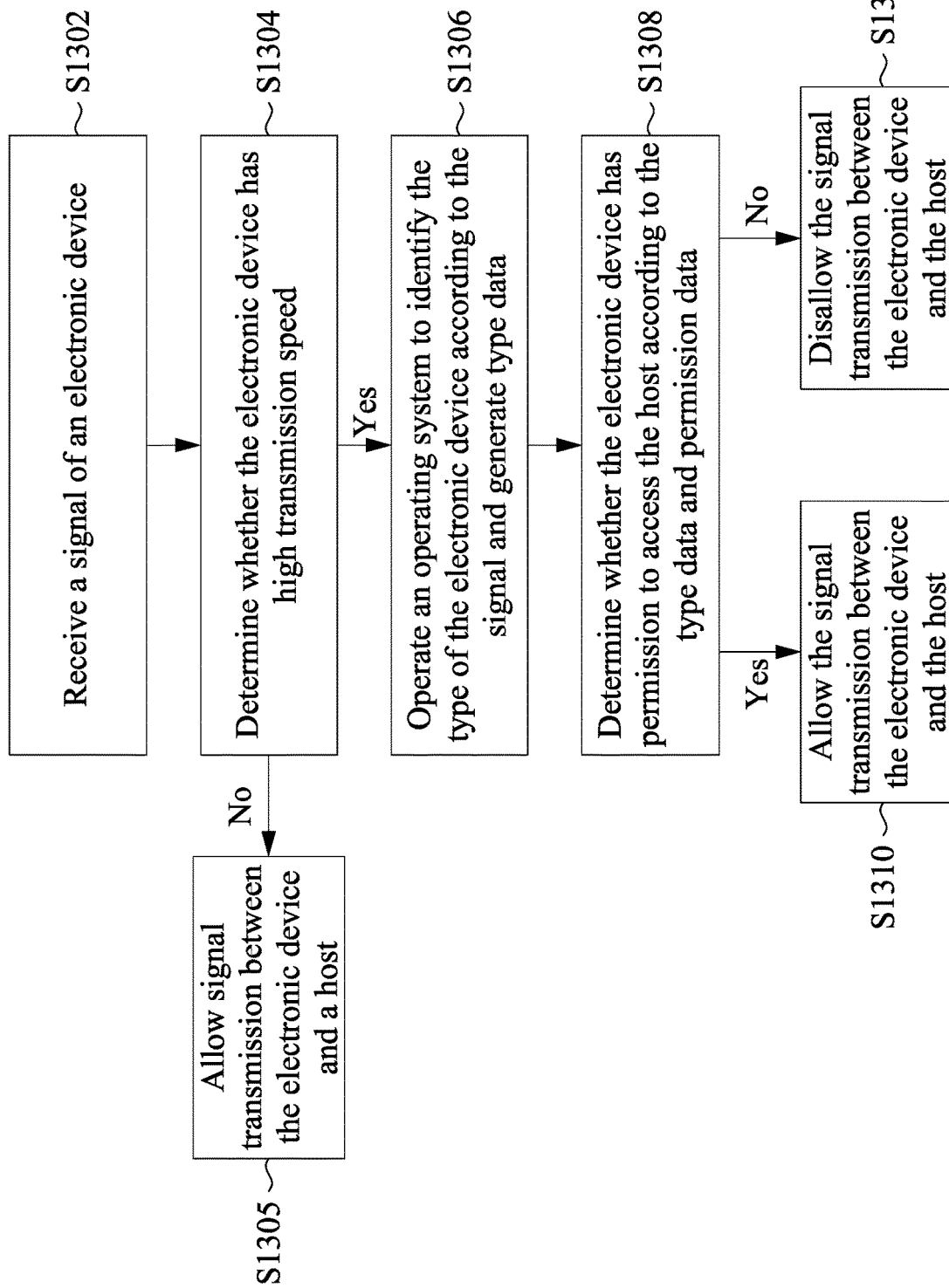
FIG. 13 is a flowchart of a management method in accordance with embodiments of the present disclosure.

The present disclosure also provides the other management method. Please refer to FIG. 13. FIG. 13 is a flowchart of a management method 1300 in accordance with embodiments of the present disclosure. The management method 1300 includes: receiving a signal of an electronic device; operating an operating system to determine the type of the electronic device according to the signal and generating type data; and determining whether the electronic device has the permission to access a host according to the type data and the permission data; if yes, allowing the signal transmission between the electronic device and a host; and if not, disallowing the signal transmission between the electronic device and the host.

In step S1302, the management method 1300 receives the signal of the electronic device. In one embodiment, the management method 1300 receives a plurality of signals from a plurality of electronic devices at the same time in step S1302.

In one embodiment, the management method 1300 determines whether the electronic device has high transmission speed (i.e., step S1304) after receiving the signal of the electronic device. If the electronic device has low transmission speed, the management method 1300 allows the signal transmission between the electronic device and the host immediately (i.e., step S1305). That is, if the answer of step S1304 is no, the management method 1300 allows the electronic device to access the host immediately according to step S1305 that is on the left side of step S1304 as shown in FIG. 13. On the contrary, if the answer of step S1304 is yes, the management method 1300 performs step S1306 that is below step S1304 as shown in FIG. 13.

In step 1306, the management method 1300 operates the operating system to determine the type of the electronic device according to the signal and generate the type data. In other words, the management method 1300 uses the operating system to determine the type of the electronic device according to the signal of the electronic device and output the result of such determination as the type data, which shows the type of the electronic device.

In step S1308, the management method 1300 determines whether the electronic device has the permission to access the host according to the type data and the permission data. In other words, the management method 1300 sets up in advance the permission data which represent the electronic devices that the host can connect to, and, after obtaining the type data, compares the type data with the permission data. If the electronic device has the permission to access the host according to the permission data, the management method 1300 allows the signal transmission between the electronic device and the host (i.e., step S1310); if the electronic device does not have the permission to access the host according to the permission data, the management method 1300 disallows the signal transmission between the electronic device and the host (i.e., step S1312). The determination of whether to allow the electronic device to access the host is thus completed.

In one embodiment, the management method 1300 receives a plurality of signals from a plurality of electronic devices at the same time and separately determines whether the signal transmissions between each of the electronic devices and the host should be allowed. That is, the determinations of the electronic devices' permissions can be performed simultaneously and such determinations are independent to each other. In one embodiment, the management method 1300 further comprises modifying the permission data to change the type of devices that the host is allowed to connect to.

In conclusion, the management method 1300 determines whether electronic devices have permissions to access the host according to the transmission speed and/or the types of electronic devices.

As demonstrated by the embodiments mentioned above, the management system described in the present disclosure can collect information from multiple docking station devices, monitor the attendance of staff, and manage the connection of network and the permissions of plug-in devices. The embodiments in the present disclosure can be used collaboratively to enhance the efficiency of office automated management.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A management system, comprising:
   an access point, configured to receive and transmit data according to a Wi-Fi protocol; and
   a plurality of docking station devices, each of the docking station devices comprising:
      an interface, configured to couple one or a plurality of electronic devices;
      a wireless sensor network transceiver circuit, configured to receive and transmit data from and to another docking station devices primarily according to a short-distance or low-energy wireless network communication protocol;
      a Wi-Fi transceiver circuit, configured to receive and transmit data from and to the access point according to a Wi-Fi protocol; and
      a control circuit, coupled to the interface, the wireless sensor network transceiver circuit, and the Wi-Fi transceiver circuit,
      wherein the docking station devices are configured to be communicatively connected to each other through their wireless sensor network transceiver circuits to form a mesh network through which a first one of the plurality of docking station devices is configured to receive data through the interface, the wireless sensor network transceiver circuit, and/or Wi-Fi transceiver circuit and then transmit the received data to a second one of the plurality of docking station devices; and
   a backend server configured to transmit a grouping signal to the plurality of docking station devices through the mesh network to divide the plurality of docking station devices into a plurality of groups, each of which has less than N of the docking station devices to form the mesh network.

2. The management system of claim 1, further comprising a backend server configured to transmit a selecting signal to at least one of the plurality of docking station devices through the mesh network to select at least one of the plurality of the docking station devices as at least one hub node, wherein the at least one hub node is configured to be communicatively connected to the access point, in response to transmission of an activating signal from the control circuit of the at least one hub node to the Wi-Fi transceiver circuit.

3. The management system of claim 2, wherein the first one of the plurality of docking station devices is configured to transmit, via the access point, the received data to another device located outside of the mesh network.

4. The management system of claim 2, wherein the at least one hub node is configured to be automatically selected by the backend server by an algorithm according to strength and relay hops of a wireless signal received by each docking station device.

5. The management system of claim 2, wherein, if a number of the at least one hub node is smaller than a specified minimum number, the backend server is configured to select one or more of the docking station devices as new hub node(s).

6. The management system of claim 5, wherein, if any of the hub nodes has a transmission loading greater than a transmission threshold, the backend server is configured to select one or more of the docking station devices as the new hub node(s).

7. The management system of claim 2, wherein, if any of the hub nodes has a transmission loading greater than a transmission threshold, the backend server is configured to select one or more of the docking station devices as new hub node(s).

8. The management system of claim 1, wherein the backend server is configured to generate the grouping signal according to a spatial database, the spatial database comprising distance and angular data of the plurality of docking station devices.

9. The management system of claim 8, wherein the backend server is configured to transmit a selecting signal to at least one of the plurality of docking station devices through the mesh network to select at least one of the plurality of the docking station devices as at least one hub node, wherein the at least one hub node is configured to be communicatively connected to the access point, in response to transmission of an activating signal from the control circuit of the at least one hub node to the Wi-Fi transceiver circuit.

10. The management system of claim 9, wherein the first one of the plurality of docking station devices is configured to transmit, via the access point, the received data to another device located outside of the mesh network.

11. The management system of claim 9, wherein the at least one hub node is configured to be automatically selected by the backend server by an algorithm according to strength and relay hops of a wireless signal received by each docking station device.

12. The management system of claim 9, wherein, if a number of the at least one hub node is smaller than a specified minimum number, the backend server is configured to select one or more of the docking station devices as new hub node(s).

13. The management system of claim 12, wherein, if any of the hub nodes has a transmission loading greater than a transmission threshold, the backend server is configured to select one or more of the docking station devices as the new hub node(s).

14. The management system of claim 9, wherein, if any of the hub nodes has a transmission loading greater than a transmission threshold, the backend server is configured to select one or more of the docking station devices as new hub node(s).

15. The management system of claim 1, wherein the backend server is configured to transmit a selecting signal to at least one of the plurality of docking station devices through the mesh network to select at least one of the plurality of the docking station devices as at least one hub node, wherein the at least one hub node is configured to be communicatively connected to the access point, in response to transmission of an activating signal from the control circuit of the at least one hub node to the Wi-Fi transceiver circuit.

16. The management system of claim 15, wherein the first one of the plurality of docking station devices is configured to transmit, via the access point, the received data to another device located outside of the mesh network.

17. The management system of claim 15, wherein the at least one hub node is configured to be automatically selected by the backend server by an algorithm according to strength and relay hops of a wireless signal received by each docking station device.

18. The management system of claim 15, wherein, if a number of the at least one hub node is smaller than a specified minimum number, the backend server is configured to select one or more of the docking station devices as new hub node(s).

19. The management system of claim 18, wherein, if any of the hub nodes has a transmission loading greater than a transmission threshold, the backend server is configured to select one or more of the docking station devices as the new hub node(s).

20. The management system of claim 15, wherein, if any of the hub nodes has a transmission loading greater than a transmission threshold, the backend server is configured to select one or more of the docking station devices as new hub node(s).

21. A docking station device, utilized for forming a mesh network, the docking station device comprising:
   an interface, configured to couple one or plural electronic devices;
   a wireless sensor network transceiver circuit, configured to receive and transmit data from and to at least one or plural other docking station device primarily according to a short-distance or low-energy wireless network communication protocol;
   a Wi-Fi transceiver circuit, configured to receive and transmit data from and to an access point according to a Wi-Fi protocol; and
   a control circuit, coupled to the interface, the wireless sensor network transceiver circuit, and the Wi-Fi transceiver circuit,
   wherein the docking station device is configured to be communicatively connected to at least one auxiliary docking station device through the wireless sensor network transceiver circuit to form the mesh network through which the docking station device receives data through the interface, the wireless sensor network transceiver circuit, and/or Wi-Fi transceiver circuit and then transmits the received data to the at least one auxiliary docking station device,
   wherein the docking station device is configured to be grouped in response to receiving a grouping signal from a backend server through the mesh network, under a plurality of groups, each of which has less than N docking station devices to form the mesh network.

22. The docking station device of claim 21, further configured to receive a selecting signal from a backend server through the mesh network to be selected as a hub node, the control circuit of which is configured to transmit an activating signal to the Wi-Fi transceiver circuit so as to be communicatively connected to an access point configured to receive and transmit data according to a Wi-Fi protocol.

23. The docking station device of claim 22, further configured to transmit, via the access point, the received data to another device located outside of the mesh network.

24. The docking station device of claim 22, wherein the hub node is configured to be automatically selected by the backend server by an algorithm according to strength and relay hops of a wireless signal received by each docking station device.

25. The docking station device of claim 22, further configured to receive a selecting signal, through the mesh network from the backend server which determines that a number of the hub nodes is smaller than a specified minimum number, to be selected as a hub node, the control circuit of which is configured to transmit an activating signal to the Wi-Fi transceiver circuit so as to be communicatively connected to the access point.

26. The docking station device of claim 25, further configured to receive a selecting signal, through the mesh network from the backend server which determines that any of the hub nodes has a transmission loading greater than a transmission threshold, to be selected as a hub node, the control circuit of which is configured to transmit an activating signal to the Wi-Fi transceiver circuit so as to be communicatively connected to the access point.

27. The docking station device of claim 22, further configured to receive a selecting signal, through the mesh network from the backend server which determines that any of the hub nodes has a transmission loading greater than a transmission threshold, to be selected as a hub node, the control circuit of which is configured to transmit an activating signal to the Wi-Fi transceiver circuit so as to be communicatively connected to the access point.

28. The docking station device of claim 21, wherein the grouping signal is generated by the backend server according to a spatial database comprising distance and angular data of the docking station device and the at least one auxiliary docking station device.

29. The docking station device of claim 28, further configured to receive a selecting signal from the backend server through the mesh network to be selected as a hub node, the control circuit of which is configured to transmit an activating signal to the Wi-Fi transceiver circuit so as to be communicatively connected to an access point configured to receive and transmit data according to a Wi-Fi protocol.

30. The docking station device of claim 29, further configured to transmit, via the access point, the received data to another device located outside of the mesh network.

31. The docking station device of claim 29, wherein the hub node is configured to be automatically selected by the backend server by an algorithm according to strength and relay hops of a wireless signal received by each docking station device.

32. The docking station device of claim 29, further configured to receive a selecting signal, through the mesh network from the backend server which determines that a number of the hub nodes is smaller than a specified minimum number, to be selected as a hub node, the control circuit of which is configured to transmit an activating signal to the Wi-Fi transceiver circuit so as to be communicatively connected to the access point.

33. The docking station device of claim 32, further configured to receive a selecting signal, through the mesh network from the backend server which determines that any of the hub nodes has a transmission loading greater than a transmission threshold, to be selected as a hub node, the control circuit of which is configured to transmit an activating signal to the Wi-Fi transceiver circuit so as to be communicatively connected to the access point.

34. The docking station device of claim 29, further configured to receive a selecting signal, through the mesh network from the backend server which determines that any of the hub nodes has a transmission loading greater than a transmission threshold, to be selected as a hub node, the control circuit of which is configured to transmit an activating signal to the Wi-Fi transceiver circuit so as to be communicatively connected to the access point.

35. The docking station device of claim 21, further configured to receive a selecting signal from the backend server through the mesh network to be selected as a hub node, the control circuit of which is configured to transmit an activating signal to the Wi-Fi transceiver circuit so as to be communicatively connected to an access point configured to receive and transmit data according to a Wi-Fi protocol.

36. The docking station device of claim 35, further configured to transmit, via the access point, the received data to another device located outside of the mesh network.

37. The docking station device of claim 35, wherein the hub node is configured to be automatically selected by the backend server by an algorithm according to strength and relay hops of a wireless signal received by each docking station device.

38. The docking station device of claim 35, further configured to receive a selecting signal, through the mesh network from the backend server which determines that a number of the hub nodes is smaller than a specified minimum number, to be selected as a hub node, the control circuit of which is configured to transmit an activating signal to the Wi-Fi transceiver circuit so as to be communicatively connected to the access point.

39. The docking station device of claim 38, further configured to receive a selecting signal, through the mesh network from the backend server which determines that any of the hub nodes has a transmission loading greater than a transmission threshold, to be selected as a hub node, the control circuit of which is configured to transmit an activating signal to the Wi-Fi transceiver circuit so as to be communicatively connected to the access point.

40. The docking station device of claim 35, further configured to receive a selecting signal, through the mesh network from the backend server which determines that any of the hub nodes has a transmission loading greater than a transmission threshold, to be selected as a hub node, the control circuit of which is configured to transmit an activating signal to the Wi-Fi transceiver circuit so as to be communicatively connected to the access point.

41. A server, utilized for controlling a mesh network formed by a plurality of docking station devices, wherein each of the plurality of docking station devices comprises:
an interface, configured to couple one or plural electronic devices;
a wireless sensor network transceiver circuit, configured to receive and transmit data from and to at least one or plural other docking station device primarily according to a short-distance or low-energy wireless network communication protocol;
a Wi-Fi transceiver circuit, configured to receive and transmit data from and to an access point according to a Wi-Fi protocol; and
a control circuit, coupled to the interface, the wireless sensor network transceiver circuit, and the Wi-Fi transceiver circuit,
wherein each of the plurality of docking station devices is configured to be communicatively connected to at least one auxiliary docking station device through the wireless sensor network transceiver circuit to form the mesh network through which each of the plurality of docking station devices receives data through the interface, the wireless sensor network transceiver circuit, and/or Wi-Fi transceiver circuit and then transmits the received data to the at least one auxiliary docking station device,
wherein the server is configured to transmit a selecting signal to at least one of the plurality of docking station devices through the mesh network to select at least one of the plurality of the docking station devices as at least one hub node,
wherein the at least one hub node is configured to be communicatively connected to the access point, in response to transmission of an activating signal from the control circuit of the at least one hub node to the Wi-Fi transceiver circuit.

42. The server of claim 41, further configured to automatically select at least one hub node by an algorithm according to strength and relay hops of a wireless signal received by each docking station device.

43. The server of claim 41, further configured to select one or more of the docking station devices as new hub node(s) if a number of the at least one hub node is smaller than a specified minimum number.

44. The server of claim 43, further configured to select one or more of the docking station devices as the new hub node(s) if any of the hub nodes has a transmission loading greater than a transmission threshold.

45. The server of claim 41, further configured to select one or more of the docking station devices as new hub node(s) if any of the hub nodes has a transmission loading greater than a transmission threshold.

46. A server, utilized for controlling a mesh network formed by a plurality of docking station devices, wherein each of the plurality of docking station devices comprises:
an interface, configured to couple one or plural electronic devices;
a wireless sensor network transceiver circuit, configured to receive and transmit data from and to at least one or plural other docking station device primarily according to a short-distance or low-energy wireless network communication protocol;
a Wi-Fi transceiver circuit, configured to receive and transmit data from and to an access point according to a Wi-Fi protocol; and
a control circuit, coupled to the interface, the wireless sensor network transceiver circuit, and the Wi-Fi transceiver circuit,
wherein each of the plurality of docking station devices is configured to be communicatively connected to at least one auxiliary docking station device through the wireless sensor network transceiver circuit to form the mesh network through which each of the plurality of docking station devices receives data through the interface, the wireless sensor network transceiver circuit, and/or Wi-Fi transceiver circuit and then transmits the received data to the at least one auxiliary docking station device, wherein the server is configured to transmit a grouping signal to the plurality of docking station devices through the mesh network to divide the plurality of docking station devices into a plurality of groups, each of which has the docking station devices of less than N.

47. The server of claim 46, further configured to generate the grouping signal according to a spatial database, the spatial database comprising distance and angular data of the plurality of docking station devices.

48. The server of claim 47, further configured to transmit a selecting signal to at least one of the plurality of docking station devices through the mesh network to select at least one of the plurality of the docking station devices as at least one hub node, wherein the at least one hub node is configured to be communicatively connected to the access point, in response to transmission of an activating signal from the control circuit of the at least one hub node to the Wi-Fi transceiver circuit.

49. The server of claim 48, further configured to automatically select at least one hub node by an algorithm according to strength and relay hops of a wireless signal received by each docking station device.

50. The server of claim 48, further configured to select one or more of the docking station devices as new hub node(s) if a number of the at least one hub node is smaller than a specified minimum number.

51. The server of claim 50, further configured to select one or more of the docking station devices as the new hub node(s) if any of the hub nodes has a transmission loading greater than a transmission threshold.

52. The server of claim 48, further configured to select one or more of the docking station devices as new hub node(s) if any of the hub nodes has a transmission loading greater than a transmission threshold.

53. The server of claim 46, further configured to transmit a selecting signal to at least one of the plurality of docking station devices through the mesh network to select at least one of the plurality of the docking station devices as at least one hub node, wherein the at least one hub node is configured to be communicatively connected to the access point, in response to transmission of an activating signal from the control circuit of the at least one hub node to the Wi-Fi transceiver circuit.

54. The server of claim 53, further configured to automatically select at least one hub node by an algorithm according to strength and relay hops of a wireless signal received by each docking station device.

55. The server of claim 53, further configured to select one or more of the docking station devices as new hub node(s) if a number of the at least one hub node is smaller than a specified minimum number.

56. The server of claim 55, further configured to select one or more of the docking station devices as the new hub node(s) if any of the hub nodes has a transmission loading greater than a transmission threshold.

57. The server of claim 53, further configured to select one or more of the docking station devices as new hub node(s) if any of the hub nodes has a transmission loading greater than a transmission threshold.

* * * * *